(12) United States Patent
Ueta et al.

(10) Patent No.: US 7,431,306 B2
(45) Date of Patent: Oct. 7, 2008

(54) METALLIC GASKET

(75) Inventors: Kosaku Ueta, Saitama (JP); Hideo Watanabe, Saitama (JP)

(73) Assignee: Japan Metal Gasket Co., Ltd., Saitama (JP)

( * ) Notice: Subject to any disclaimer, the term of this patent is extended or adjusted under 35 U.S.C. 154(b) by 0 days.

(21) Appl. No.: 11/206,461

(22) Filed: Aug. 18, 2005

(65) Prior Publication Data

US 2005/0285352 A1    Dec. 29, 2005

Related U.S. Application Data

(63) Continuation of application No. 10/250,422, filed as application No. PCT/JP02/11795 on Nov. 12, 2002, now Pat. No. 7,011,313.

(30) Foreign Application Priority Data

| | | |
|---|---|---|
| Apr. 4, 2002 | (JP) | 2002/102437 |
| Jun. 5, 2002 | (JP) | 2002/164260 |
| Jul. 17, 2002 | (JP) | 2002/208718 |
| Jul. 18, 2002 | (JP) | 2002/209387 |
| Jul. 31, 2002 | (JP) | 2002/223901 |
| Aug. 28, 2002 | (JP) | 2002/248920 |
| Oct. 18, 2002 | (JP) | 2002/304210 |

(51) Int. Cl.
*F02F 11/00* (2006.01)
(52) U.S. Cl. .................. 277/594; 277/593; 277/595; 277/596
(58) Field of Classification Search .......... 277/592–596
See application file for complete search history.

(56) References Cited

U.S. PATENT DOCUMENTS 3,352,564 A    11/1967    Johnson (Continued)

FOREIGN PATENT DOCUMENTS

EP    0853204 A1    7/1998

(Continued)

OTHER PUBLICATIONS

European Search Report dated Dec. 9, 2003.

(Continued)

*Primary Examiner*—Alison K Pickard
(74) *Attorney, Agent, or Firm*—Young Basile

(57) ABSTRACT

A metallic gasket including a base plate having a convex metal bead formed, by bending the base plate, between a combustion chamber opening and on the outer periphery portion of the base plate, and a first thickness-increased portion formed thicker than the remaining portions of the base plate to provide a difference in thickness, by which a surface pressure is made to concentrate on the first thickness-increased portion to seal a joint between a cylinder head and a cylinder block when the metallic gasket is disposed between the joint surfaces of the cylinder head and the cylinder block and fastened by clamping bolts. An elastic sealing material is fixed to the convex portion of the metal bead and filled in a concave portion on the reverse side of the base plate to form a rubber bead, and the sealing material is deformed under compression in the through-thickness direction in cooperation with the deformation of the metal bead when the gasket is fastened with clamping bolts. This gasket reduces production cost and preserves a stable sealing performance for extended periods of time.

7 Claims, 24 Drawing Sheets

U.S. PATENT DOCUMENTS

| | | | |
|---|---|---|---|
| 3,930,656 A * | 1/1976 | Jelinek | 277/611 |
| 4,140,323 A * | 2/1979 | Jacobs | 277/594 |
| 4,721,315 A | 1/1988 | Ueta | |
| 4,815,750 A | 3/1989 | Yoshino | |
| 4,830,698 A * | 5/1989 | DeCore et al. | 156/219 |
| 5,310,196 A | 5/1994 | Kawaguchi et al. | |
| 5,431,418 A | 7/1995 | Hagiwara et al. | |
| 5,472,217 A | 12/1995 | Hagiwara et al. | |
| 5,582,415 A | 12/1996 | Yoshida et al. | |
| 5,626,350 A | 5/1997 | Kubouchi et al. | |
| 5,690,342 A | 11/1997 | Tanaka et al. | |
| 5,984,317 A | 11/1999 | Grant-Acquah et al. | |
| 6,019,376 A * | 2/2000 | Miyaoh | 277/593 |
| 6,145,847 A | 11/2000 | Maeda et al. | |
| 6,168,166 B1 | 1/2001 | Akimoto | |
| 6,318,733 B1 | 11/2001 | Udagawa | |
| 6,343,795 B1 | 2/2002 | Zerfass et al. | |
| 6,502,830 B2 | 1/2003 | Teranishi et al. | |
| 6,517,085 B2 | 2/2003 | Udagawa et al. | |
| 6,682,080 B2 | 1/2004 | Miyaoh | |
| 2002/0000696 A1 | 1/2002 | Okazaki et al. | |
| 2004/0130102 A1 | 7/2004 | Ueta et al. | |

FOREIGN PATENT DOCUMENTS

| | | |
|---|---|---|
| JP | 63036877 | 2/1981 |
| JP | 61177256 | 8/1986 |
| JP | 63180769 | 7/1988 |
| JP | 63210465 | 9/1988 |
| JP | 01300043 | 12/1989 |
| JP | 04248070 | 9/1992 |
| JP | 06101761 | 4/1994 |
| JP | 09144887 | 6/1997 |
| JP | 200230640 | 8/2000 |
| JP | 2001032938 | 2/2001 |
| JP | 2001032941 | 2/2001 |
| JP | 2001173791 | 6/2001 |

OTHER PUBLICATIONS

International Search Report PCT/JP02/11795 dated Jan. 29, 2003.

* cited by examiner

METALLIC GASKET

This application is a continuation of Ser. No. 10/250,422 filed on Jun. 27, 2003 which is incorporated herein by reference.

TECHNICAL FIELD

The present invention relates to a metallic gasket sandwiched between opposing joint surfaces, and more particularly to a metallic gasket to seal joint surfaces of a cylinder block and a cylinder head of an internal combustion engine, for example, by being sandwiched between the joint surfaces.

BACKGROUND ART

Among conventional metallic gaskets of this kind, there is a metallic gasket shown in FIG. 51 that is described in Japanese Patent Laid-Open No. 6-101761, for example. More specifically, this well-known metallic gasket is provided with a thickness-increased portion X formed at an inner peripheral portion of the combustion chamber opening 2 in a base plate 1 by folding back the peripheral portion on the combustion chamber opening 2 side of the base plate 1 or by mounting a shim plate 3 to the outer peripheral portion of the base plate and this gasket is also provided with a second thickness-increased portion C, which is thinner than the first thickness-increased portion X and formed by folding back an outer peripheral portion of the base plate. In addition, a rubber bead 4 is fixed on the outer side of the first thickness-increased portion X in a manner to protrude on both surfaces of the base plate and a rubber bead 5 lower in thickness than the thickness of the rubber bead 4 is fixed on the inner side of the second thickness-increased portion C in a manner to protrude on both surfaces of the base plate.

When the metallic gasket structured as described is sandwiched between the joint surfaces of the cylinder block and the cylinder head and fastened by clamping bolts, the rubber beads 4, 5 are compressed and deformed in the through-thickness direction, and at the end of fastening, because of the thickness difference between the first thickness-increased portion X of the largest thickness and the remaining portions of the base plate, surface pressure concentrates on the first thickness-increased portion and the largest load acts on it.

Therefore, applied to the joint is a fourfold seal which includes the surface pressure of the first thickness-increased portion X and the resilience of the rubber bead 4, and the surface pressure of the second thickness-increased portion C and the resilience of the rubber bead 5. Further, owing to the thickness-increase effect of the first thickness-increased portion X, the rubber bead 4 is prevented from totally collapsing and, also owing to the thickness-increase effect of the second thickness-increased portion C, the rubber bead 5 is prevented from totally collapsing.

As a second conventional metallic gasket, there is one which is described in Japanese Utility Model Application Laid-Open No. 63-180769, for example.

This metallic gasket is made by forming a base plate from a thin metal plate having rigidity, such as stainless steel plate, and various kinds of holes are formed in the base plate, such as an opening for the combustion chamber bore, bolt holes, oil holes. The holes, which require sealing, are enclosed by a full bead provided along the seal line. A repeated load by vibration amplitude caused by engine operation is applied to the metallic gasket, and in order to prevent fatigue failure of the bead by the repeated stress, the thickness-increased portions, formed to suppress the amount of bead deformation that occurs in the through-thickness direction, are provided along the whole internal peripheral portion on the combustion chamber opening side of the base plate.

With the progressive reductions of weight and size of the engine, the clearance between the adjacent combustion chamber openings is becoming smaller and the range in which beads and thickness-increased portions can be provided is becoming narrower in the boundary area between the adjacent combustion chamber openings. In view of this trend, in the prior art, a shared bead has come to be used in the boundary area, and furthermore, a thickness-increased portion with a minimum width is formed between the combustion chamber openings in the middle of this boundary area and a wide-width thickness-increased portion is formed in each end of the boundary area according to the clearance between the peripheral edges of the adjacent combustion chamber openings.

In order to secure a necessary sealing pressure by the bead which is elastically deformed in the through-thickness direction, a high-rigidity material, as mentioned above, is used for the conventional base plate.

Moreover, as the third conventional kind of metallic gasket, there is one which is disclosed in Japanese Patent Laid-Open No. 63-210465, for example.

In this metallic gasket, bead is a metal bead that is formed by bending the base plate (Refer to FIG. 52), and as shown in FIGS. 53 and 54, in a converge-diverge points M where seal lines 50 converge and diverge, the bead width becomes relatively wide, and after the seal lines 50 come together, they merge into a seal line 50 and the seal line 50 gradually becomes narrower.

There is another form of converge-diverge point which is described in Japanese Patent Laid-Open No. Hei 1-300043. More specifically, in this example, as shown in FIG. 55, a full bead which is protruded in one surface side in the form of mountain branches off into two half beads in stepped form, or, viewed differently, the two half beads converge into a full bead. This is a metal bead formed by bending a base plate.

Further, the fourth conventional type of metallic gasket is disclosed in Japanese Patent Laid-Open 2001-173791.

As shown in FIG. 59, this metallic gasket is formed by two base plates 50. More specifically, out of the two base plates 50, in the thicker base plate (the upper base plate), its end portion on the combustion chamber opening 51 side is bent to form a thickness-increased portion 52, and in each of the base plates 50, a convex bead 53 is formed on the outer side of the thickness-increased portion 52 so as to be higher than the thickness of the thickness-increased portion 52, and both base plates 50 are put together such that the convex portions of the base plates 53 facing each other. Moreover, the concave portions of the beads each facing outside are filled with an elastic sealing material 54.

When the above-described metallic gasket is sandwiched between the opposing joint surfaces of the cylinder block and the cylinder head and they are fastened by clamping bolts, the base-plate beads are compressed and deformed down to the thickness of the thickness-increased portion in the inner peripheral portion of the combustion chamber opening, and the elastic sealing material 54 filled in the concave portions is compressed and deformed to thereby seal the combustion gas, oil and cooling water pressure by a sealing pressure generated by a composite force including the spring force of the beads 53 made of the base plate and the resilience of the elastic sealing material 54. It goes without saying that there are conventional metallic gaskets without any elastic sealing material 53 filled in the concave portion and also there are conventional metallic beads made up of a single piece of base plate.

However, in the first conventional metallic gasket shown in FIG. 51, the rubber beads 4, 5 are provided on both surfaces of the base plate 1, and if the thickness of the folded-back portion of the thickness-increased portion is designated as t0, because the rubber beads 4 are provided on each surface of the base plate 1, the height of a rubber bead 4, for example, is t0/2+the compression-deformed amount ((t0/2×0.4 (40% max.)). Assuming that t0 is 0.5 mm, the height of the bead 4 is 0.35 mm from the above equation. Thus, if the thickness of the base plate is thicker, it is possible to set a compression-deformed amount which sufficiently suits processing accuracy. However, if the thickness of the base plate is thinner, the compression-deformed amount is small so that it becomes difficult to process rubber beads, processing accuracy becomes stricter, thus increasing production cost.

Since water holes are normally formed in the base plate 1 between the rubber beads 4, 5, the rubber beads 4, 5 are exposed to cooling water, thus deteriorating their durability.

In the second conventional metallic gasket, a high-rigidity thin metal plate is adopted for the base plate to obtain a sufficient sealing pressure by elastic deformation of the beads, and therefore a thickness-increased structure is adopted to prevent fatigue failure of the beads, which is likely to occur by adoption of thin metal plate of high rigidity. However, the engines do not cease evolving and attempts have been made to reduce engine size and weight, improve performance and decrease fuel consumption, and as a result, there is a tendency toward higher combustion temperature and larger amplitude of vibration.

Therefore, even if a thickness-increased structure is adopted to prevent fatigue failure of the bead, as long as the conventional metallic gasket structures is used, there is a possibility that the bead suffers fatigue failure in a period of time shorter than a planned lifetime.

In the engines, a changeover to aluminum has been taking place for lightweight and better workability. When a cylinder block and a cylinder head are made by casting of aluminum, blowholes occur in the casting process, and while the joint surfaces are machined, blowholes may run through one to another, stretching across the seal line of the bead, giving rise to incomplete sealing somewhere in the joint.

Further, during plane processing of the joint surfaces of the engine, tool marks are left on the surfaces. To compensate for the tool marks, heat-resistant rubber with a thickness about twice the depth of the tool marks is applied to the gasket in a manner to cover the whole surface of the base plate with a rubber coating. If processing finish is rough, it is necessary to increase the thickness of the rubber coating, which will lead to a decrease in torque.

As has been described, the bead surfaces are covered with a thin rubber coating and the bead is so formed as to seal the joint by its rounded portion. Since the bead is formed by thin metal plate with high rigidity, it has a high resilience, and though the thickness-increase effect has been reduced, because internal stress concentrates in the above-mentioned rounded portion, when fatigue failure runs from one crack to another or the rubber coating is abraded off by vibration amplitude, the metal at the rounded portion of the gasket directly contacts the seal surface, which results in fretting or gas leak or fatigue failure.

Further, since the engines have been reduced in size and weight, the rigidity of the engines has decreased, unless the fastening axial tension is decreased, bore deformation will increase, which leads to greater oil consumption or power loss. For this reason, it appears that there is high demand for metallic gaskets which maintain sufficient sealing performance even if the fastening axial tension is made smaller than before.

In the third conventional metallic gasket, the bead seals the joint by metal contact and line contact by using a metal bead. Therefore, it is necessary to form the base plate, in other words, the bead by a material of high rigidity to increase the spring stress of the bead to secure a required sealing pressure.

More specifically, as shown in FIGS. 53, 54, it is inevitable that there are some partially wide parts at the converge-diverge points M of the seal line 50. As described above, this gasket has a structure to seal the joint only by the spring force of the metallic bead, and forms a line seal at three points (See A, B and C in FIG. 52) of the radius R of the bead, and at the converge-diverge point M where the bead width widens, as the span A-B becomes wide, the spring force becomes weak and sealing surface pressure becomes relatively low. However, it is impossible to increase the outer side radius R of the converge-diverge points M of the seal line 50.

Around the converge-diverge point M of the seal line 50, the bead has a relatively narrow width and forms a small radius R, with the result that the bead has a strong spring force close to that of a rigid body. Near the bead with strong spring force, there is locally formed a wide-width bead with a small spring force, in other words, partly with a low sealing pressure, and when a high pressure is applied to the wide-width bead, the bead is deformed partly, which results in leakage of pressure or liquid.

A metallic gasket with the above problem in mind is shown in FIGS. 56 and 57. With the bead of this metallic gasket, each of the seal lines that flow together into the converge-diverge point M is designed to keep its width as constant as possible. However, as described above, a high hardness material is used to provide high rigidity by which to generate a high spring force, for which reason the converging radius R of the line outside the converge-diverge point M cannot be made large, so that this gasket is nothing other than a minor improvement that is unable to obtain an equalized surface pressure because the above-mentioned radius R is small.

Among the conventional metallic gaskets is a type disclosed in Japanese Utility Model Laid-Open No. 5-42830. As shown in FIG. 58, this metallic gasket has a concave space formed in the middle of a wide-width converge-diverge point M to keep the bead width of the converge-diverge point M as constant as possible. However, this gasket has a shortcoming that the concave space in the middle is confined by seal lines, resulting in the converge-diverge point M having too strong a spring force.

As has been described, at the converge-diverge point M of the seal line 50, the bead width of the metal bead changes locally, and it is difficult to keep a uniform bead width. With the above-mentioned conventional metallic gasket, because it is necessary to set a large spring force for the bead, a high hardness material is used. Therefore, if the bead width changes as mentioned above, the spring force changes greatly. With the structure that parts of small radius R are inevitably formed as in the converge-diverge point M and that some parts exist where the spring force is large locally, supposing that the engine is made of aluminum, the sealing surfaces of the engine are prone to denting and scratching. If the engine sealing surfaces have local dented flaws, the flaws will lead to pressure leak when the gasket is changed. Even if the engine is made of cast iron, the converge-diverge point M is formed in a structure such that the surface pressure of the converge-diverge point M of the seal line 50 is high at the part of small radius R of the line outside the part M and that the part of a large radius R inside the part M is liable to oil leakage.

A base plate that has a larger number of converge-diverge points M requires a larger fastening force, and thus requires a larger total fastening axial tension.

When the rigidity of the region of the outer periphery of the base plate is weak, because of a large stress at the converge-diverge point M, the region of the outer periphery of the base plate is subject to a large deformation, which may lead to pressure leakage.

Besides on the converge-diverge part M, internal stress concentrates on the rounded portion of high hardness material, which may lead to fatigue failure by the amplitude of vibration and further lead to short lifetime.

In the fourth conventional metallic gasket (See FIG. 59), a resilience is generated jointly by the base-plate beads 53 and the elastic sealing material 54 filled in the concave portions when they are deformed by fastening, thus generating a required sealing pressure along the seal line.

However, if the base plates 50 are formed by metal plate of low hardness with a view to preventing fatigue failure of the base-plate beads 53 and reducing cost, in the above-mentioned conventional metallic gaskets, when bolts are fastened and the elastic sealing material 54 of the concave portion of the bead is compressed and deformed, an external force is applied such that the base plates 50 and the base-plate beads 53 are deformed in a manner to warp in the through-thickness direction. Since the base plates 50 are formed of metal of low hardness as mentioned above, the beads have a low shape-retaining force and accordingly the base plate 50 have an insufficient deformation-preventive force and hence a low sealing property.

By repeated load by repetition of operation and stoppage of the engine, after a long period of use, problems arise, such as a decrease in axial tension of the clamping bolts, changes with time of the base-plate bead 53 on the base plate 50, or deterioration in the elastic sealing material 54 of the concave portion of the bead; therefore, the sealing surface pressure is likely to drop. Such problems tend to manifest particularly at overhanging parts on the outer side of the clamping bolts.

When the elastic sealing material 54 is formed by baking in the concave portions of the base plates, even if the elastic sealing material 54 at high temperature is filled in the concave portions, it changes in volume by an amount of thermal expansion during subsequent open cooling, the center portion of the elastic sealing material 54 where the thickness is at its highest shrinks by an amount of thermal shrinkage. This is disadvantageous when the surface pressure decreases as described above. Such a phenomenon as this seems to be likely to occur particularly when the gasket is mounted in the engine which has been assembled with a weak fastening axial tension.

SUMMARY OF THE INVENTION

The present invention has been made to solve the above problems, and has as its task to provide a metallic gasket capable of reducing cost and securing a stable seal performance for a long period of time.

To achieve the above task, a metallic gasket comprising a base plate made of a thin metal plate and having formed therein one or not less than two openings, such as bolt holes, beads formed along seal lines and a first thickness-increased portion thicker than the remaining portions of the base plate to cause a surface pressure to concentrate on the first thickness-increased portion and said bead to be deformed in the through-thickness direction to thereby seal a joint of opposing joint surfaces when the metallic gasket is sandwiched between the joint surfaces and fastened by clamping bolts, wherein said bead comprises, in combination, a metal bead and a rubber bead, the metal bead being formed by bending the base plate in the through-thickness direction to form a convex portion, on one surface of the base plate, with a height higher than the thickness of the first thickness-increased portion, and the rubber bead made of an elastic sealing material being fixed to a surface of the convex portion of the metal bead and filled in a concave portion opposite the convex portion, wherein the rubber bead is compressed and deformed in the through-thickness direction in cooperation with the deformation of the metal bead.

The first thickness-increased serves to limit the compression-deformed amount of the bead to an appropriate value, in other words, can securely prevent compression fracture of the bead.

The amount of the elastic sealing material, which has been increased, on the convex portion side of the metal bead increases the compression-deformed amount, facilitating processing of an elastic sealing material and making it possible to increase the thickness of the elastic sealing material. Therefore, it becomes possible to set a processing tolerance on the large side, and reduce manufacturing cost.

Moreover, this metallic gasket offers less opportunity for the elastic sealing material on the convex portion of the metal bead to be exposed to cooling water and the elastic sealing material filled in the concave portion of the metal bead is covered with the metal bead and is not exposed to cooling water. Thus, preventing the elastic sealing material from deteriorating in quality and securing a stable seal performance for a long period.

Further, a necessary sealing pressure can be obtained by synergy of the resilience of the metal bead and the elastic resilience of the rubber bead made by an elastic sealing material fixed to the convex portion and filled in the concave portion of the metal bead, so that it becomes possible to decrease the hardness of the base plate and stunt the fatigue failure of the metal bead. Moreover, it is possible to absorb the vibration amplitude of the engine and also absorb the roughness of the seal surface, and it is possible to appropriately seal off cooling water pressure and oil pressure with not large pressure.

Further, a wide sealing area can be taken for the elastic sealing material on the convex portion of the metal bead and also for the elastic sealing material on the concave portion of the metal bead. Therefore, it is possible to suitably seal the flaws on the joint surface and blowholes, which occur in casting, with a low surface pressure. Moreover, since the elastic sealing material consists of an elastic substance (rubber-based, above all else), the gasket factor is low, for which reason a limited axial load can be utilized effectively in the areas under adverse condition, thereby reducing total load.

A case is assumable where an elastic sealing material is used only in the concave portion, but if the base plate has a low hardness, when the elastic sealing material in the concave portion is compressed and deformed, there is a possibility that the metal bead and the flat portion of the base plate continuous to the metal bead are deformed in the through-thickness direction. In this case, the sealing pressure is decreased by a deformation in the through-thickness direction. In contrast, in the present invention, an elastic sealing material is applied even on the side where there is the convex portion and by this elastic sealing material on the convex portion side, the above mentioned deformation in the through-thickness direction is inhibited, thereby inhibiting a decrease in the sealing pressure.

Incidentally, it is desirable to limit the largest width of the rubber bead on the convex portion side within 1.5 times the width of the metal bead with the exception of the portions which are subjected to a large pressure such as bolted portions. It is necessary to apply more load to the base plate where the rubber bead has a larger width. From a viewpoint of inhibiting an increase in load, it is desirable to limit the width of the bead of an elastic sealing material within 1.5 times the width of the metal bead as mentioned above. This does not apply to where one wants to apply large load locally.

Next, the invention is characterized in that the metal bead is either a full bead or a half bead in a stepped form.

When a bead protrudes on one surface from a reference plane of the base plate, this is a convex bead portion of the bead. On the surface of the convex portion surface, a concave portion is necessarily formed. Note that with a half bead mentioned above, the concave portion on the reverse side of the surface of the convex portion forms an inclined surface, and the elastic seal may be fixed to a flat place continuous to the inclined surface.

The invention is also characterized in that the elastic sealing material fixed to the surface on the convex side of the metal bead is fixed at least to the surface of convex portion.

The elastic sealing material is fixed to the convex portion of the metal bead, in other words, the surface rising from the base-plate flat surface, such as the inclined surface, thereby leaving less chances for the elastic sealing material to separate from the base plate, and even when a rubber bead is formed, the above-mentioned structure prevents the bead width from becoming wider than required.

Next, the invention is also characterized in that the height of the elastic sealing material fixed to the surface of the convex portion of the metal bead is equal to or substantially equal to the convex portion of the metal bead.

The invention is also characterized in that some of openings formed in the base plate are combustion chamber openings and that the above-mentioned first thickness-increased portion is formed in a manner to endlessly encircle the combustion chamber openings.

By providing the first thickness-increased portion at the peripheral edge of the combustion chamber opening, it becomes possible to seal the combustion chamber opening at a high pressure.

The invention is also characterized in that a peripheral end portion on the combustion chamber opening side of the base plate is folded back and the first thickness-increased portion is formed by putting a shim plate inside the folded-back portion.

The total thickness of the first thickness-increased portion is made thin in the vicinity of a bolt hole where the surface pressure is relatively high, and it is made thick between bolt holes where the surface pressure is relatively low. Therefore, the surface pressure that acts on the first thickness-increased portion is equalized in the circumferential direction when clamping bolts are fastened, so that the roundness of the cylinder bore can be secured, and the axial tension of the clamping bolts can be reduced, thereby properly preventing the engine, particularly a low-rigidity engine from being deformed.

The invention is also characterized in that the total thickness of the first thickness-increased portion is made thin in the vicinity of the holes for clamping bolts and is made thick between the bolt-receiving holes and the total thickness is varied in the radial direction of the combustion chamber openings.

Next, the invention is characterized in that the second thickness-increased portion thinner than the first thickness-increased portion is provided in the region along the outer periphery of the base plate.

The invention is also characterized in that lubricant is applied to one or both surfaces of the base plate.

By application of lubricant to one surface or two surfaces, fretting can be prevented which is caused by shifts or knocking resulting from a difference in thermal expansion between the engine and the gasket or from vibration amplitude. In other words, lubricant should desirably be applied the parts that contact the joint surfaces.

In the invention, a metallic gasket comprising a base plate made of a thin metal plate having formed therein a plurality of combustion chamber openings arranged adjacent to each other, a thickness-increased portion thicker than the remaining portions of the base plate and seal lines formed encircling the internal circumference of each combustion chamber opening, and beads formed along the seal lines, wherein in a boundary area between the adjacent combustion chamber openings, common beads are formed to be shared by the adjacent combustion chamber openings, and beads formed along the neighboring peripheral edges of the adjacent combustion chamber openings are combined to form a bead in an integral structure, wherein the widths of the thickness-increased portions located in the boundary area and extending along the internal circumferences of the combustion chamber openings are set according to a clearance between the adjacent combustion chamber openings, wherein the bead is a composite body of a metal bead formed as a convex portion having a height higher than the thickness-increased portion by bending the base plate in the through-thickness direction and a rubber bead formed by fixing to the convex portion surface of the metal bead an elastic sealing material capable of exhibiting a spring force by deformation under compression in the through-thickness direction, and by filling the concave portion on the reverse side of the convex portion with the elastic sealing material, and wherein the elastic sealing material is fixed at least to the surface of the convex portion of the metal bead and the height of the elastic sealing material is set to be equal to or substantially equal to the height of the metal bead.

In the boundary area between the adjacent combustion chamber openings, the clearance along the internal circumferences of the combustion chamber openings is normally smallest at the middle point of the boundary area, so that the width of the thickness-increased portion is narrowest at the middle point and becomes wider toward both ends.

According to this invention, the required sealing pressure is generated by synergy of the resilience of the metal bead and the elastic resilience of the elastic sealing material fixed to the metal bead position, and because of this the hardness of the base plate material can be reduced. Therefore, the internal stress locked up in the folded portion of the radius R is so small that there is no room for worry about fatigue failure. Moreover, because of the improved workability in forming the thickness-increased portion, use of soft base plate for the metal bead, and use of elastic, flexible rubber bead (elastic sealing material) attached to both surfaces of the metal bead, the deformation load of the bead has been reduced drastically and most of the fastening axial tension can be applied to the thickness-increased portion encircling the combustion chamber opening, making it possible to decrease the fastening axial tension.

Since a large seal area can be secured which is covered with an elastic sealing material, the flaws on the joint surface and blowholes that occur in casting can be sealed properly with a low surface pressure.

Because an elastic sealing material is fixed to the surface of the convex-side base plate of the metal bead where a gap would occur between the joint surface and the base plate, more specifically, fixed, for example, to the position that faces the external circumferential region of the joint surfaces, entry of water or the like into the gap can be prevented.

In addition, by fixing the elastic sealing material to the convex portion, in other words, to the inclined surface of the metal bead, the elastic sealing material can be made less likely to separate from the base plate.

Next, the invention is characterized in that the thickness-increased portion is varied in thickness partly to equalize the surface pressure when the gasket is inserted between the joint surfaces.

For example, the thickness of the thickness-increased portion in the vicinity of the bolt holes or the like is set to a relatively low level, where the surface pressure is likely to be high.

According to the present invention, because the boundary area between the adjacent combustion chamber openings is narrow, even if the width of the thickness-increased portion along the internal circumference of the combustion chamber opening changes, in other words, even if the thickness-increased portion has a minimum width in the middle part of the boundary area, for example, the thickness of the thickness-increased part is varied in the region along the circumference to thereby equalize the surface pressure during fastening along the circumference in order that an effective sealing performance can be obtained even in the narrow-width thickness-increased portion between the combustion chamber openings.

At this time, as has been described above, because the hardness of material for the base plate can be decreased, it becomes easy to locally change the height of the thickness-increased portion.

Next, the invention is also characterized in that at least the protrusion height or the width of the metal bead is varied partly along the seal line to thereby equalize the sealing surface pressure by the bead provided along the seal line.

Next, the invention is characterized in that at least the protrusion height or the width of the rubber bead is varied partly along the seal line to thereby equalize the sealing surface pressure by the bead provided along the seal line.

Next, the invention is characterized in that a metallic gasket includes a base plate having a plurality of seal lines formed on the base plate made of thin metal plate, beads formed along each seal line, and a converge-diverge part formed where at least some of the plurality of seal lines converge or diverge at specified points, wherein the bead formed along each seal line comprises, in combination, a metal bead and a rubber bead, the metal bead being formed in a convex shape only on one surface of a base plate by bending in a through-thickness direction thereof and the rubber bead made of an elastic sealing material being fixed to a surface of the convex portion of the metal bead and filled in a concave portion on the reverse side of the convex portion, the rubber bead being compressed and deformed in the through-thickness direction in cooperation with the deformation of the metal bead, and wherein at least in the converge-diverge part, the elastic sealing material on the surface of the convex portion is fixed at least to the surface of the metal bead and the height of the rubber bead is set to be equal to or substantially equal to the height of the metal bead.

According to this invention, the bead is formed in a composite structure of a metal bead and a rubber bead to make it possible to decrease the hardness of the metal bead, in other words, the base plate. As the hardness of the metal bead is decreased, the difference in sealing pressure caused by a difference in the width of the metal bead is substantially reduced.

The invention is characterized in that a thickness-increased portion is formed by partly increasing the thickness of the base plate in the through-thickness direction, and the compression-deformed amount of the bead is regulated by the increased thickness of the thickness-increased portion.

In the wide-width portion formed in the converge-diverge part, as long as the seal function is achieved by the elastic sealing material filled in the concave portion of the bead and by the elastic sealing material part formed on the convex portion side, since the metal bead is formed in the base plate of low hardness and a spring load is generated by a soft elastic sealing material attached to both surfaces of the metal bead, the bead according to this invention tends to be weaker than a spring force generated by a base plate of high hardness, and if an excessive load is applied owing to a large volume expansion or if the amplitude of vibration is great, for example, or if the fastening axial tension is large, for one thing, deformation will occur, which may lead to a decrease in a sealing force.

In contrast to this, in the invention set forth in claim 15, to prevent the above problem, a thickness-increased portion is formed by folding back the whole inner peripheral edge of an opening in the base plate or partly forming a thickness-increased portion by folding back a part of the outer peripheral edge of the base plate or creating thickness-increased portions on both peripheral edges at the same time, this thickness-increased portion regulates the amounts of deformation in both the metal bead in the base plate and the rubber bead on the upper and lower surfaces of the metal bead. In other words, the maximum amount of deformation is limited to a predetermined value even if the rigidity of the base plate is reduced, and the thickness-increased portion suppresses excessive load or vibration amplitude, thereby securing a stable sealing property for a long period of time. Moreover, even if soft steel is used as the base plate to provide less expensive gaskets, it is possible to provide metallic gaskets capable of a desired sealing of the joint.

When a thickness-increased portion is provided in the region encircling the combustion chamber opening, by changing the amount of thickness increase in the circumferential direction, it is possible to even out the fastening surface pressure in the circumferential direction.

The invention is also characterized in that by adjusting the width of the rubber bead in the converge-diverge part, the sealing pressure in the converge-diverge part is made to match or come close to the sealing pressure at the seal lines other than the converge-diverge part.

According to this invention, by adjusting the width of the rubber bead whose width at the converge-diverge part is easy to adjust, the sealing pressure of the converge-diverge part is adjusted so as to be equal to that of the other seal lines, making it possible to efficiently repress leakage of the seal.

Supposing a case where an elastic sealing material is applied only to the concave portion of the metal bead under the condition that the hardness of the base plate has been reduced to minimize the deformation load in the metal bead and load on parts such as the converge-diverge part, because the rigidity of the base plate is low, the metal bead is made liable to deform by the deformation of the elastic sealing material in the concave portion (the metal bead is deformed in such a manner that that portion of the base plate lying on both sides of the metal bead warps toward the convex portion side. This leads to deformation of the base plate itself.) Consequently, the above-mentioned deformation further weakens the spring of the metal bead. In this invention, the spring force of the rubber bead is reinforced by providing the elastic sealing material on the convex portion side of the metal bead while inhibiting the lowering of the spring force by the above-mentioned deformation of the metal bead.

The largest width of the rubber bead provided on the convex portion side should preferably be within 1.5 times the width of the metal bead with the exception of the portions which are subjected to a larger pressure such as bolted portions. Because it is necessary to apply more load to the base plate where the rubber bead has a larger width, from a viewpoint of inhibiting an increase in load, it is desirable to limit the width of the bead made of an elastic sealing material within 1.5 times the width of the metal bead as described above. This does not apply where one wants to apply large load locally.

As the elastic sealing material provided on both surfaces of the base plate makes area contact with the joint surfaces, an area seal is obtained, and furthermore a complete seal can be achieved when the processing roughness on the seal surfaces is absorbed and blowholes as casting defects are within the bead width and the flexible elastic sealing material adapts itself to the flaws that run across the seal line, although the seal line used to have weakness for flaws along the outer periphery of the base plate, which has been a defect in the existing linear seal line. Since an elastic sealing material part such as rubber, is used for the rubber bead, the gasket factor of the bead according to this invention is low, and if the gasket factor is not less than 2, a sufficient seal can be obtained, and as a result, total fastening load can be reduced. Moreover, it becomes possible to adopt a low hardness material for the base plate, and because of this it is possible to inhibit fatigue failure of the metal bead.

Next, the invention is characterized in that in the converge-diverge part where the metal bead diverges from a full bead into a plurality of full beads or a plurality of full beads converge into a full bead, the rubber bead width is adjusted so that the ratio of the rubber bead width on the convex portion side of the metal bead to the metal bead width becomes smaller in the converge-diverge part than in the remaining portions of the bead.

At a converge-diverge part where the seal lines intersect in the form of the letter T, Y or X, there is a part where the width of the metal bead is wide, and in this wide-width part, the concave portion of the metal bead is filled with a larger amount of elastic sealing material than in the regular portion of the bead, which results in a large deformation load. In contrast, in this invention, in order to make the deformation load close to that of the bead other than at the converge-diverge part, in the above-mentioned ratio, the width of the rubber bead on the convex portion is formed to be narrower than the width of the regular portion of the bead to thereby inhibit an increase in the spring load in the wide-width portion at the converge-diverge part, thus evening out the sealing pressure along the seal line, including the converge-diverge part.

The invention is also characterized in that in the converge-diverge part where the metal bead diverges from a full bead into a plurality of half beads in a stepped form or a plurality of half beads in a stepped form converge into a full bead, the rubber bead width is adjusted so that in the vicinity of the clamping bolts the ratio of the rubber bead width to the metal bead width becomes larger in the converge-diverge part than in the remaining portions of the bead.

In the full bead where the metal bead is in a convex protrusion in the form of mountain, when deformed in the through-thickness direction, the elastic sealing material filled in the concave portion, being unable to escape, exhibits a sufficient spring force. In the metal half bead in a stepped form, the elastic sealing material filled in the concave portion changes its shape as if to escape sideways when deformed in the through-thickness direction and its spring force becomes smaller. At the converge-diverge part, as the metal bead width becomes wider, the spring force becomes smaller. In this respect, by adjusting the rubber bead to make its width relatively wider, the sealing pressure along the seal line, including the converge-diverge part, is equalized.

Next, the invention is characterized in that one or not less than two lines of protrusion are formed along the seal line at least one of the surface of the elastic sealing material fixed to the surface of the convex portion and the surface of the elastic sealing material filled in the concave portion, in which those elastic sealing material parts constitute the rubber bead.

Next, the invention is characterized in that one or not less than two lines of protrusion are formed on the portions where the sealing surface pressure is relatively low on at least one of the surface of the elastic sealing material fixed to the convex portion and the surface of the elastic sealing material filled in the concave portion, those elastic sealing material parts constituting the rubber bead.

Next, the invention is characterized in that at least one of the height and the width of each line of the above-mentioned protrusion is varied in their extending direction according to the sealing surface pressure at a position where the protrusion is formed and a larger value of at least one of the height and the width of the protrusions is set where the sealing surface pressure is lower.

The invention is also characterized in that a plurality of rows of protrusion are formed on at least one of portions of elastic sealing material, either the one fixed to the surface on the convex portion or the other one filled in the concave portion, and in the plurality of rows of protrusion, at least one of the height of the protrusion and an area per unit length is varied according to the sealing surface pressure at the position where the protrusion is formed.

Note that a protrusion is formed on the overhanging portion of the base plate where the surface pressure is weak, and that a protrusion may not be formed in the vicinity of bolts.

The invention is also characterized in that a plurality of base plates are stacked in multiple layers.

BEST MODE FOR CARRYING OUT THE INVENTION

A first embodiment of the present invention will be described with reference to the accompanying drawings.

Figure 1:
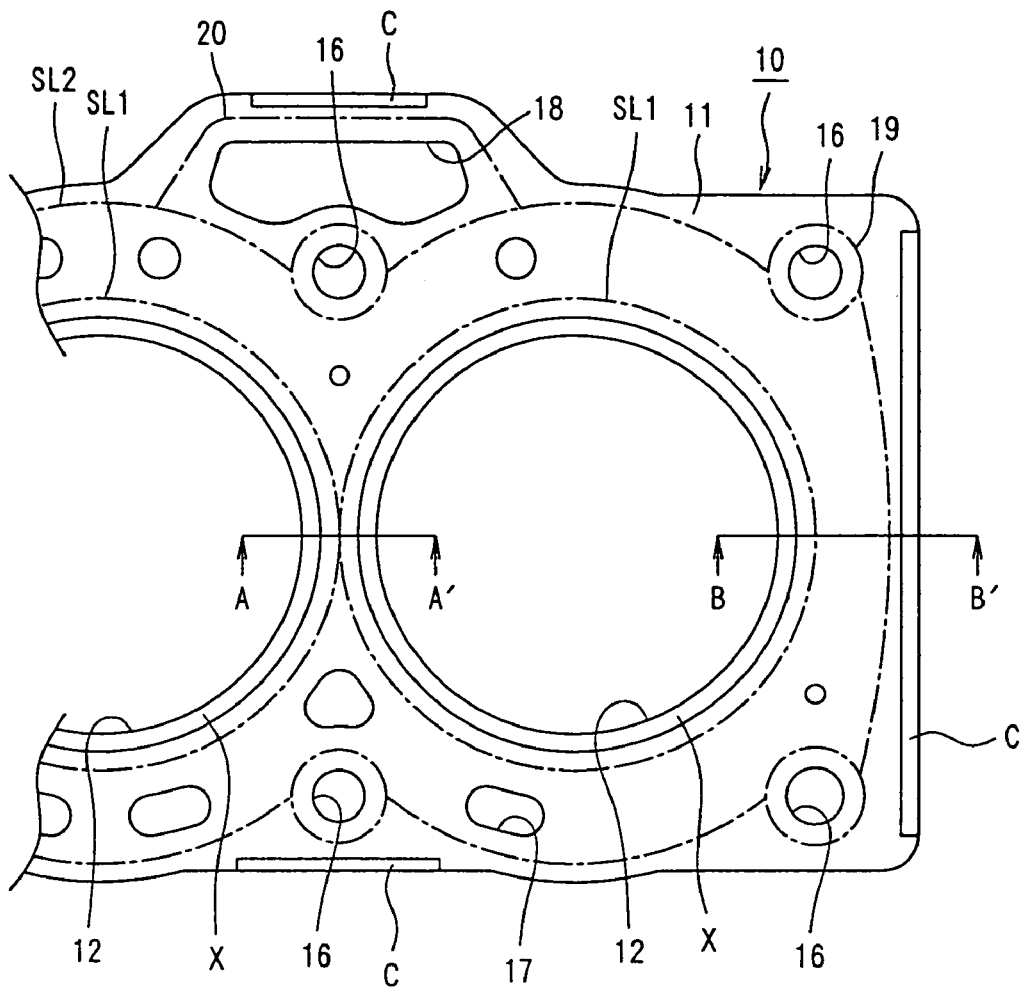
FIG. 1 is a plan view of an essential part for explaining a metallic gasket according to a first embodiment of the present invention.
Figure 2:
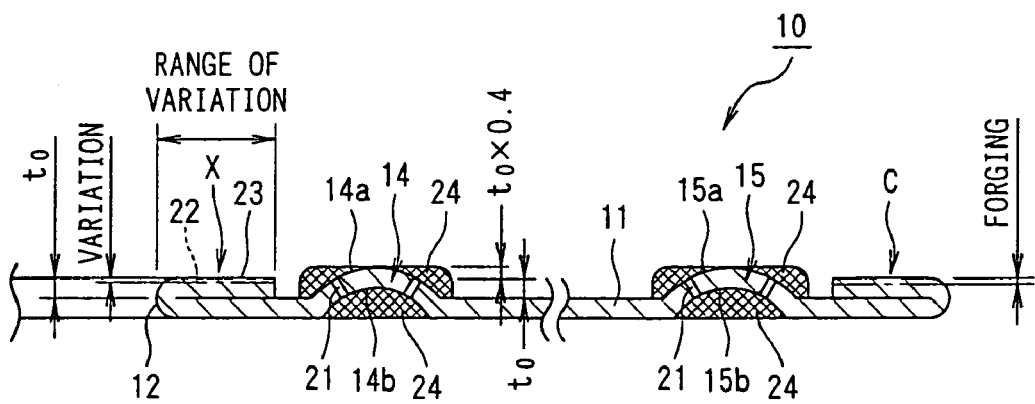
FIG. 2 is a sectional view taken along the line B-B in FIGS. 1 and 13.
Figure 3:
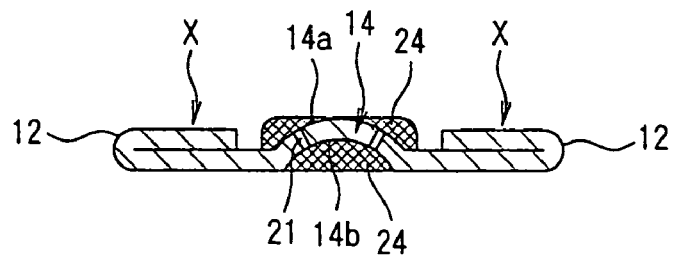
FIG. 3 is a sectional view taken along the line A-A in FIG. 1.

FIG. 1 is a plan view of an essential part for explaining a metallic gasket according to an example of a first embodiment of the present invention. FIG. 2 is a sectional view taken along the line B-B in FIGS. 1 and 13. FIG. 3 is a sectional view taken along the line A-A. FIGS. 4 to 20 are diagrams for explaining metallic gaskets in other forms of the first embodiment of the present invention.

A metallic gasket as an example of the first embodiment of the present invention will be described with reference to FIGS. 1 to 3. A metallic gasket 10 comprises a base plate 11 made of metal plate, such as stainless steel plate or soft steel plate. A plurality of combustion chamber openings 12 are formed in the base plate 11 in a manner to correspond to the extreme ends of cylinder bores.

The peripheral end portion on the combustion chamber opening 12 side of the base plate 1 is upwardly folded back to form a first thickness-increased portion X which is the thickest part of the base plate 11 to give a difference in thickness between the thickness-increased portion and the remaining portions of the base plate 11. Similarly, the edge portion on the outer periphery side of the base plate 11 is upwardly folded back and becomes a second thickness-increased portion C, and the second thickness-increased portion C is made thinner by forging than the first thickness-increased portion.

As shown in FIGS. 2 and 3, the convex full bead 14 (metal bead) is formed by bending the base plate 11 along each of the seal lines SL1 and SL2 on the outer side of the thickness-increased portion X of the base plate 11. At the same time, a convex full bead (metal bead) whose height is equal to or lower than the full bead 14 is formed on the inner side of the second thickness-increased portion C of the base plate by bending the base plate 11. The height of the convex portion 14a of the full bead 14 is made slightly higher than the first thickness-increased portion X (by about 0.05 to 0.2 mm depending on the thickness of the first thickness-increased portion), and the height of the convex portion 15a of the full bead 15 is made slightly higher than the second thickness-increased portion C (by about 0.05 to 0.2 mm depending on the thickness of the second thickness-increased portion).

A plurality of bolt holes 16 for clamping bolts are formed in the base plate 11 substantially equally spaced in the circumferential direction of the combustion chamber hole 12. Water holes 17 are formed between the full beads 14 and 15, and an oil hole is formed between the bolt hole 16 and the second thickness-increased portion C. A convex full bead 19 is formed around the bolt hole 16 in the base plate 11 by bending the base plate 1, and a convex full bead 20 is formed around the oil hole by bending the base plate 11.

Further, the folded-back portion of the first thickness-increased portion X of the base plate 11 is made a thin portion 22 in the vicinity of the bolt holes 16, but it is made a thick portion 23 between the bolt holes 16 such that the thickness is varied in the circumferential direction of the combustion chamber opening 12. The total thickness of the thin portion 22 of the first thickness-increased portion X is made thicker than the total thickness of the second thickness-increased portion C.

In this embodiment, rubber beads are formed such that an elastic sealing material 24, e.g., a rubber material, fluororubber, NBR or silicon rubber, a resin material or the like is fixed to the convex portions 14a, 15a of the full beads 14, 15 and also to the convex portions (not shown) of the full beads 19, 20, and a similar elastic sealing material 24 is filled in the concave portions 14b, 15b on the reverse side of the convex portions 14a, 15a of the full beads 14, 15 and also to the concave portions (not shown) on the reverse side of the convex portions (not shown) of the full beads 19, 20.

On the convex portions of the full beads 14, 15, 19 and 20, an elastic sealing material 24 is fixed in such a manner that its width is substantially equal to the width of those full beads and the elastic sealing material 24 covers both sides across the width of the width of those full beads, and that the height of the elastic sealing material 24 is substantially equal to the height of the convex portion of those full beads and its top surface is substantially parallel with the flat surface of the base plate 11.

On the other hand, the amounts of the elastic sealing material 24 filled in the concave portions of the full beads 14, 15, 19 and 20 are substantially equal to the capacities of the concave portions and the surface of the elastic sealing material is substantially flush with the flat surface of the base plate 11.

In this embodiment, the elastic sealing material 24 is fixed to the convex portion and filled in the concave portion of the full bead by molding. For this purpose, passages 21 for molding material are formed in the full beads 14, 15, 19 and 20 to enable simultaneous molding of the convex portions and the concave portions of the full beads.

When a metallic gasket 10 structured as described is sandwiched between the joint surfaces of the cylinder block and the cylinder head and fastened with clamping bolts, the elastic sealing material 24 fixed to the convex portion side and filled in the concave portion side of the full beads 14, 15, 19 and 20 is compressed and deformed in the through-thickness direction in cooperation with the deformation of the full beads, and at the end of fastening, the largest surface pressure concentrates on the first thickness-increased portion X and the largest load acts on it due to a difference in thickness between the first thickness-increased portion X with the largest thickness of the base plate and the remaining portions.

Therefore, a threefold seal is applied, which comprises the largest surface pressure on the first thickness-increased portion X, the elastic resilience of the full bead 14 (including the elastic sealing material 24 at the convex portion and the concave portion), and the elastic resilience of the full bead 15 (including the elastic sealing material 24 at the convex portion and the concave portion), and simultaneously the larger thickness effect of the first thickness-increased portion X prevents total collapse of the full bead 14 and the elastic sealing material 24 fixed to the convex portion side and filled in the concave portion side of the full bead 14, and the larger thickness effect of the second thickness-increased portion C prevents total of the full beads 15, 19 and 20 and the elastic sealing material 24 fixed to the convex portion side and filled in the concave portion side of the full beads 15, 19 and 20.

In the metallic gasket 10 structured as described, since the elastic sealing material 24 is fixed to the convex portions 14a and 15a of the full beads 14 and 15 and the convex portions of (not shown) of the full beads 19 and 20 and also the elastic sealing material 24 is filled in the concave portions 14b and 15b of the full beads 14 and 15 and the concave portions (not shown) of the full beads 19 and 20, the elastic sealing material 24 that protrudes from the base plate 11 is the elastic sealing material only on the convex portion side of the full beads, in other words, on one side of the base plate 11.

Figure 51:
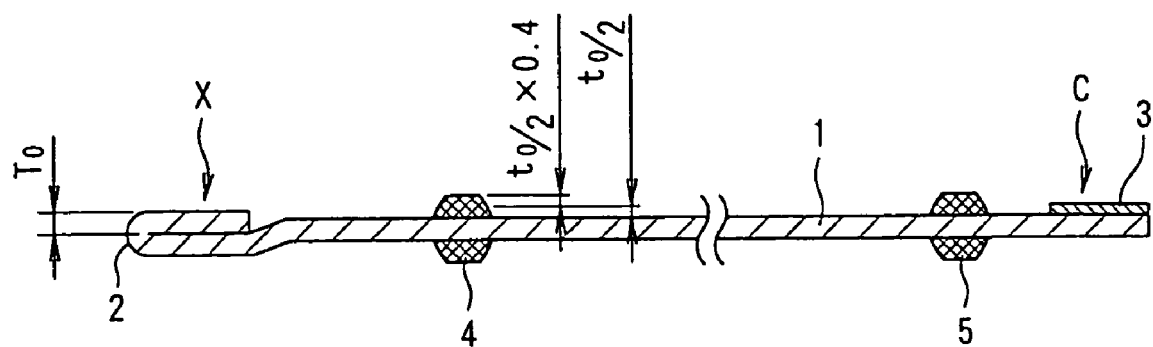
FIG. 51 is an explanatory sectional view for explaining a conventional metallic gasket.
Figure 52:
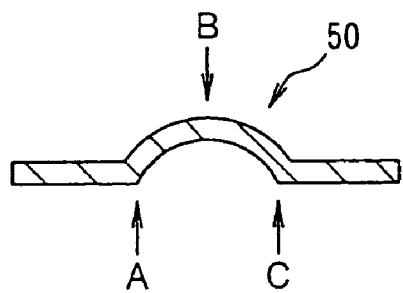
FIG. 52 is a sectional view showing a conventional bead.
Figure 53:
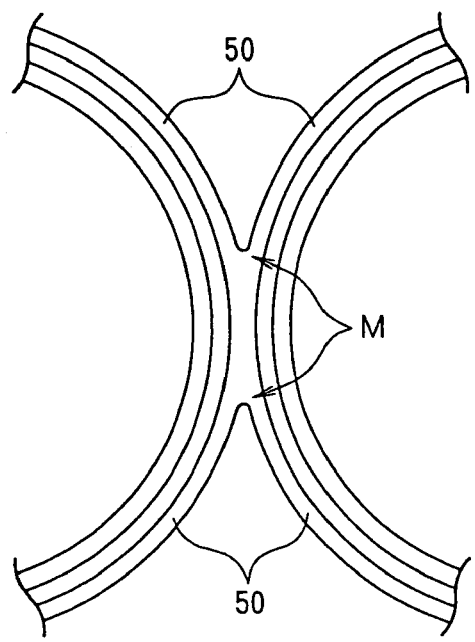
FIG. 53 is a plan view showing a conventional converge-diverge part.
Figure 54:
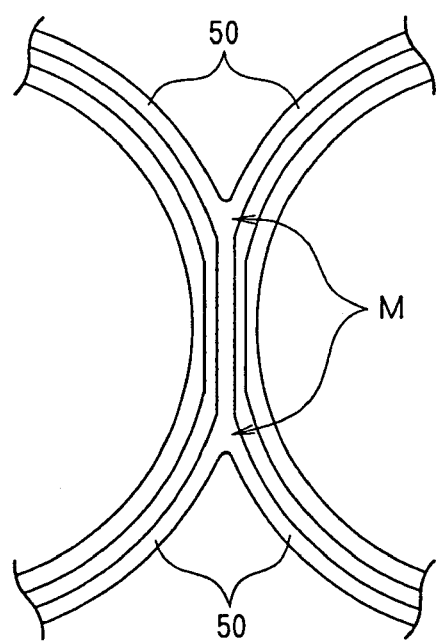
FIG. 54 is a plan view showing a conventional converge-diverge part.
Figure 55:
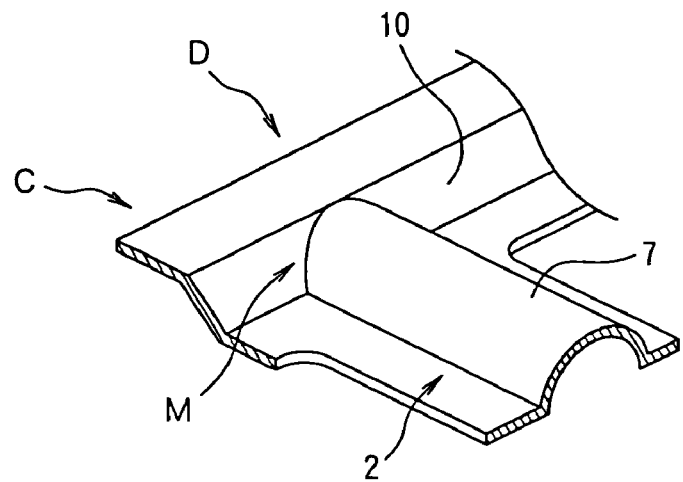
FIG. 55 is a plan view showing a conventional converge-diverge part.
Figure 56:
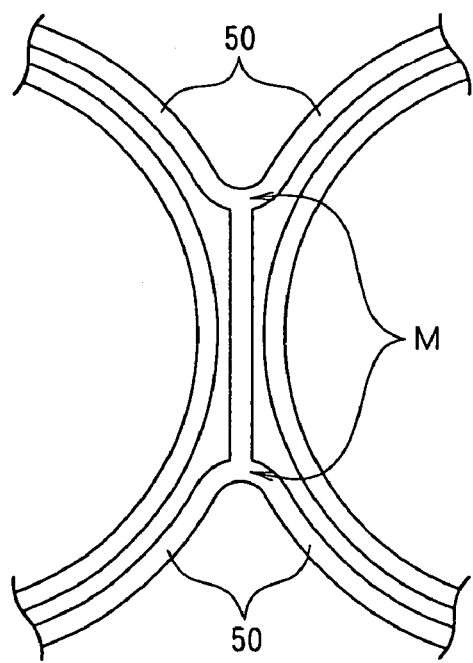
FIG. 56 is a plan view showing a conventional converge-diverge part.
Figure 57:
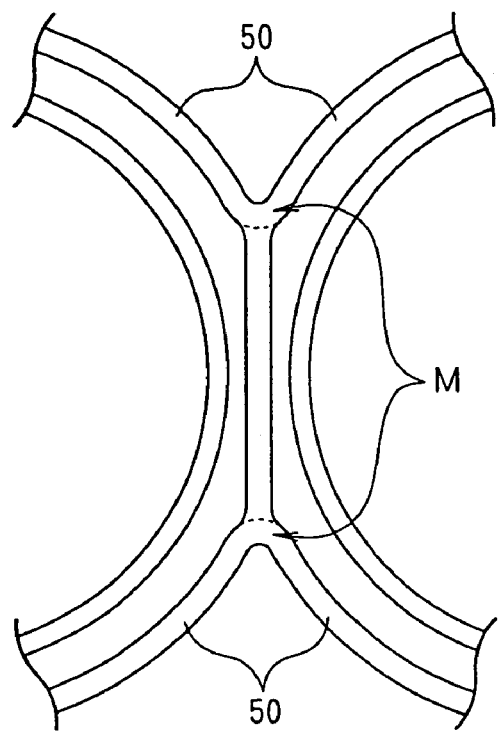
FIG. 57 is a plan view showing a conventional converge-diverge part.
Figure 58:
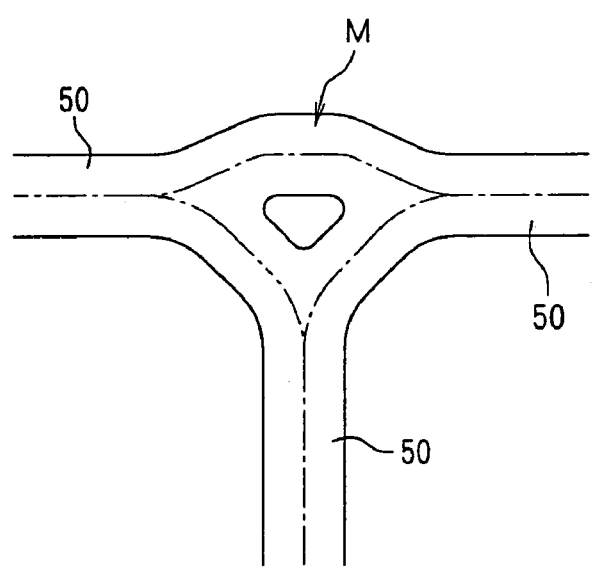
FIG. 58 is a plan view showing a conventional converge-diverge part.
Figure 59:
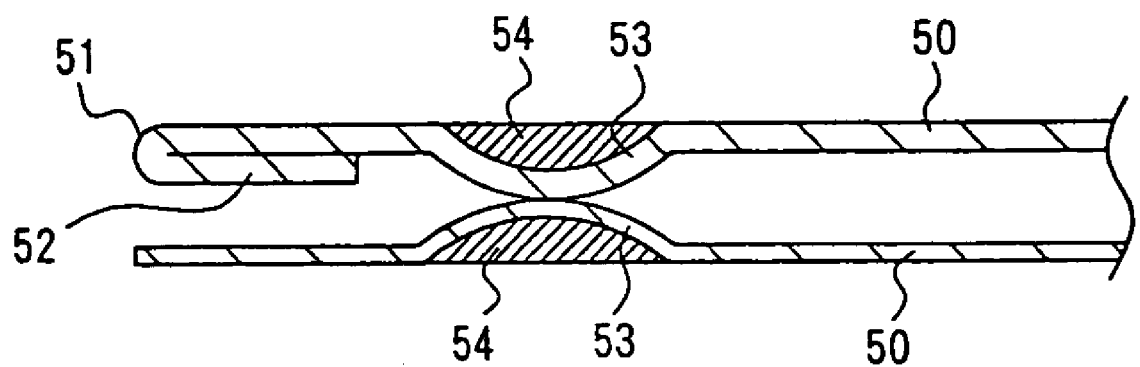
FIG. 59 is a diagram for explaining a fourth conventional metal bead.

Therefore, the height of the elastic sealing material 24 fixed to the convex portion 14a of the full bead 14, for example, is t0+the compression-deformed amount (t0×0.4 (40% max.)) if the thickness of the folded-back portion of the baseplate 11 at the first thickness-increased portion X is designated as t0 by referring to FIG. 2, and assuming that t0 is 0.5 mm, the height of the rubber bead is 0.7 mm from the above equation, which is twice the 0.35 mm in prior art shown in FIG. 51.

Therefore, the elastic sealing material 24 on the convex portion 14a side of the full bead 14 increases in quantity, and their compression-deformed amounts become larger, making it easy to carry out a forming process of the elastic sealing material, and making it possible to increase the thickness of the elastic sealing material part so that it becomes possible to set a larger processing tolerance and reduce manufacturing cost.

Further, the elastic sealing material 24 fixed to both sides across the width of the convex portions 14a and 15a of the full beads 14, 15 is exposed to cooling water only at the areas facing the water hole 17 side. On the other hand, the elastic sealing material 24 filled in the concave portions 14b, 15b of the full beads 14, 15 is covered with the full beads 14, 15 and is not exposed to cooling water, for which reason the elastic sealing material is protected from deterioration and therefore can maintain a stable seal performance for a long period of time.

Further, a required sealing pressure is obtained by synergy of the resilience of the full beads 14, 15, 19 and 20 and the elastic resilience of the elastic sealing material 24 fixed to the convex portion side and filled in the concave portion side of the full beads 14, 15, 19 and 20, a fact which makes it possible to decrease the hardness of the base plate, therefore eliminate worries about fatigue failure of the beads of the base plate, absorb the engine vibration amplitude and the seal area roughness, and thereby seal cooling water pressure and oil pressure with a lower surface pressure.

Further, since a wide sealing area can be secured for the elastic sealing material 24 on the convex portion side of the full beads 14, 15, 19 and 20 and for the elastic sealing material 24 on the concave portion side of the full beads 14, 15, 19 and 20, the flaws on the joint surface and the blowholes that occur in casting can be sealed satisfactorily with a low surface pressure. Furthermore, since the elastic sealing material 24 consist of an elastic substance (rubber-based material, above all else), the gasket factor is low, and therefore a limited axial load can be utilized effectively in the areas under adverse condition, so that total load can be decreased.

Further, the first thickness-increased portion X of the base plate 11 is made a thin web area 22 in the vicinity of the bolt holes 16, but it is made a thick web area 23 between the bolt holes 16 such that the resilience of the first thickness-increased portion X during fastening the bolts is weak in the vicinity of clamping bolts whose fastening force is large, but the resilience is stronger in the area between the clamping bolts whose fastening force is relatively small. Consequently, the surface pressure applied to the first thickness-increased portion X can be equalized in the circumferential direction of the combustion chamber opening 12 and the axial tension of the clamping bolts can be decreased, thus making it possible to effectively prevent deformation of the engine, especially, in engines of low rigidity.

The structure of the metallic gasket according to this invention is not intended as a definition of the limits of the invention, but may be changed at discretion without departing from the scope and the spirit of the invention.

Figure 4:
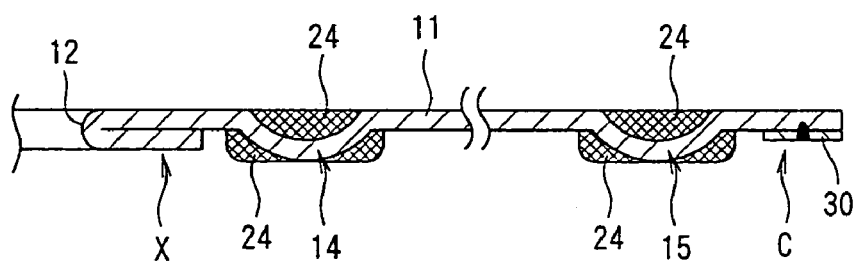
FIG. 4 is an explanatory sectional view for explaining another metallic gasket according to the first embodiment of the present invention.
Figure 6:
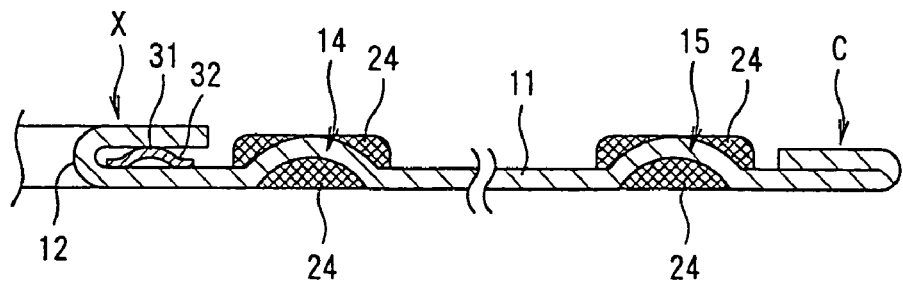
FIG. 6 is an explanatory sectional view for explaining yet another metallic gasket according to the first embodiment of the present invention.
Figure 7:
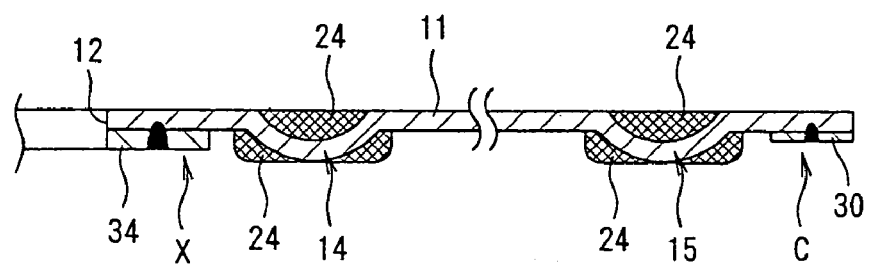
FIG. 7 is an explanatory sectional view for explaining a still other metallic gasket according to the first embodiment of the present invention.
Figure 9:
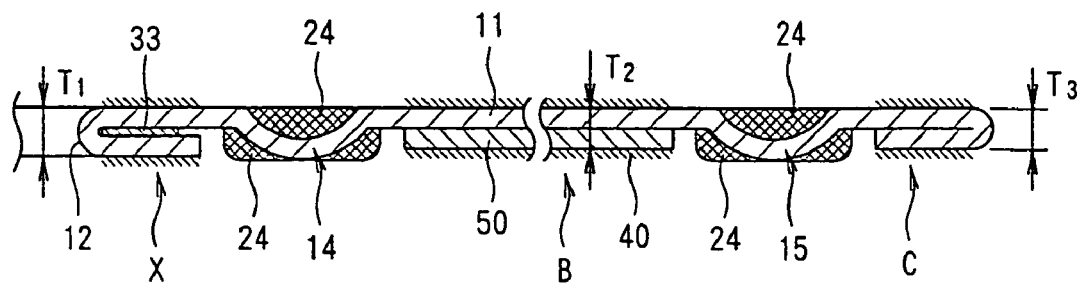
FIG. 9 is an explanatory sectional view for explaining a still further metallic gasket according to the first embodiment of the present invention.

For example, in the embodiment mentioned above, the second thickness-increased portion C is made thinner by forging after folding back the edge portion on the outer periphery side of the base plate 11. As an alternative for this, as shown in FIGS. 4 and 7, for example, the second thickness-increased portion C may be formed by attaching, by welding for example, a shim plate 30 thinner than the base plate may be mounted to the outer peripheral region of the base plate 11 to thereby omit the above-mentioned forging of the second thickness-increased portion C. As shown in FIG. 6, a shim plate formed as a full bead 31 may be included in the folded portion of the thickness-increased portion X, or as shown in FIG. 9, a flat shim plate 33 may be included in the folded portion of the first thickness-increased portion X to thereby omit the forging of the second thickness-increased portion C.

Figure 10:
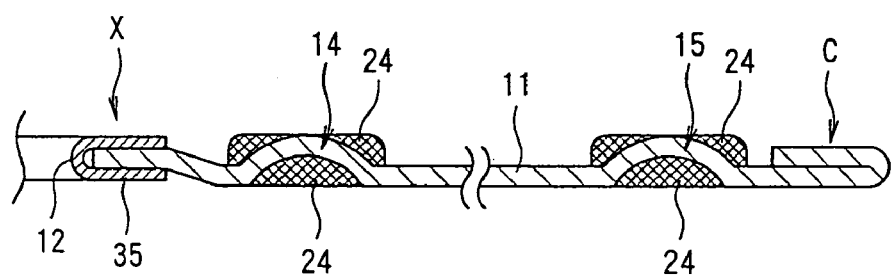
FIG. 10 is an explanatory sectional view for explaining a still additional metallic gasket according to the first embodiment of the present invention.
Figure 11:
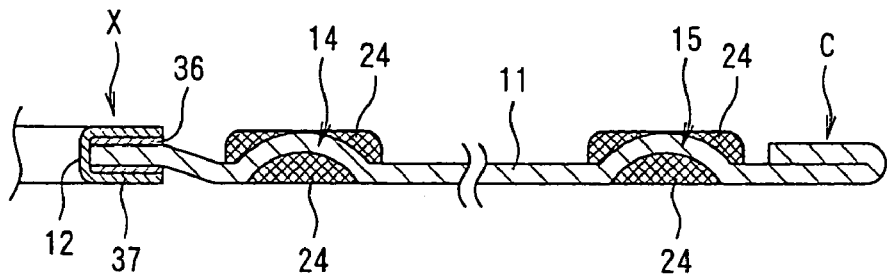
FIG. 11 is an explanatory sectional view for explaining an another metallic gasket according to the first embodiment of the present invention.
Figure 17:
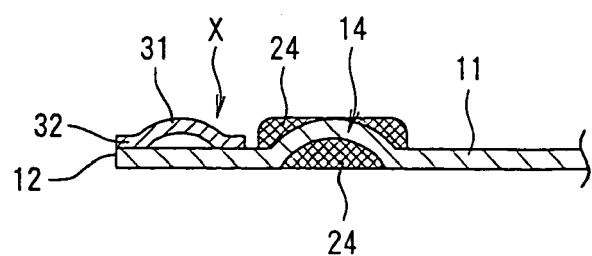
FIG. 17 is an explanatory sectional view for explaining another metallic gasket according to the first embodiment of the present invention.

Further, in the above-mentioned embodiment, the first thickness-increased portion X is formed by folding back the end portion on the combustion chamber opening 12 side of the base plate 11, but as an alternative for this, as shown in FIG. 7, the first thickness-increased portion X may be formed by attaching a shim plate 34 substantially equal in thickness to the base plate 11 to the end portion on the combustion chamber opening 12 side of the base plate 11 by welding, for example. Or, the first thickness-increased portion X may be formed by fitting a grommet 35 over the end portion on the combustion chamber opening 12 side of the base plate 11 as shown in FIG. 10, or by fitting a grommet 37 over the end portion on the combustion chamber opening 12 side of the base plate 11 through the intermediary of an elastic plate 36 as shown in FIG. 11, or by attaching a shim plate 32 formed as a full bead 31 to the end portion on the combustion chamber opening 12 side of the base plate 11 by welding, for example, as shown in FIG. 17.

Figure 5:
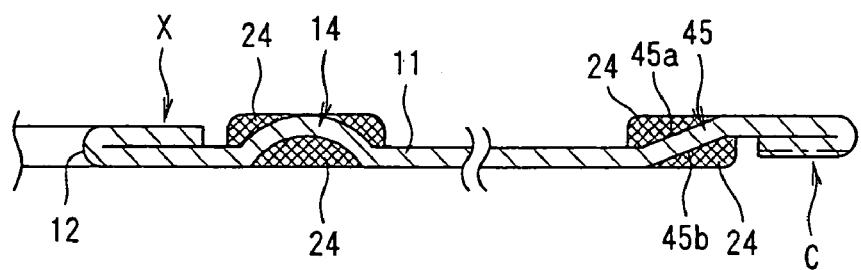
FIG. 5 is an explanatory sectional view for explaining a further metallic gasket according to the first embodiment of the present invention.
Figure 8:
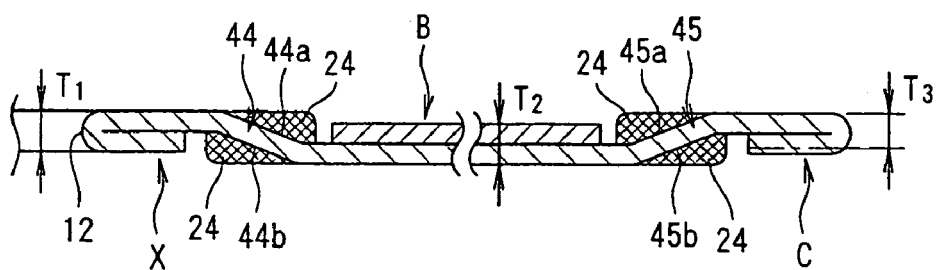
FIG. 8 is an explanatory sectional view for explaining an additional metallic gasket according to the first embodiment of the present invention.

Further, in the above-mentioned embodiment, description has been made of an example that the full bead 14 is formed on the outer side of the first thickness-increased portion X of the base plate 11 and a full bead 15 is formed on the inner side of the second thickness-increased portion C of the base plate 11, and then the elastic sealing material 24 is fixed to the convex portions 14a and 15a and is filled in the concave portions 14b and 15b of the full beads 14 and 15. However, this is not intended as a definition of the limits of the invention, and as shown in FIGS. 5 and 8, on the inner side of the second thickness-increased portion C of the base plate 11, in place of the full bead 15, a half bead 45 in a stepped structure may be formed by bending the base plate 11, and an elastic sealing material 24 may be fixed to the convex portion 45a and filled in the concave portion 45b on the reverse side of the convex portion of the half bead. Further, as shown in FIG. 8, in place of the full bead 14, on the outer side of the first thickness-increased portion X of the base plate 11, a half bead 44 in a stepped structure may be formed by bending the base plate 11, and an elastic sealing material 24 may be fixed to the convex portion 44a and filled in the concave portion 44b of the half bead 44.

The elastic sealing material 24 filled in the concave portions 44b and 45b of the half beads 44 and 45 is so formed as to be substantially flush with the flat surface of the base plate 11, and therefore the elastic sealing material is not exposed to cooling water, but the elastic sealing material 24 fixed to the convex portions 44a and 45a protrudes from the flat surface of the base plate and is directly exposed to cooling water. In this case, by providing the elastic sealing material 24 fixed to the convex portions 44a and 45a with a wide width, the elastic sealing material 24 in its entirety can be prevented from deteriorating, thereby ensuring its superior sealing performance.

Further, as shown in FIGS. 8 and 9, a third thickness-increased portion B may be formed by providing a thick plate 50 substantially equal in height to or thinner than the base plate 11 between the half beads 44 and 45 or between the full beads 14 and 15 of the base plate 11, thereby preventing the engine from being deformed by receiving load on a wide area in engines with large total load, such as a diesel engine. In this case, the relation among the thickness T1 of the first thickness-increased portion X, the thickness T2 of the third thickness-increased portion B, and the thickness T3 of the second thickness-increased portion C is set as T1>T2 T3.

Figure 12:
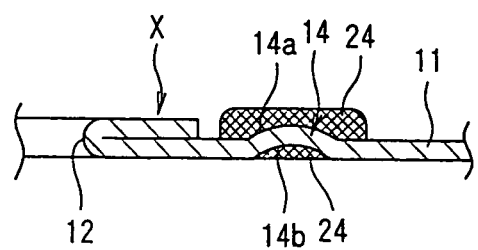
FIG. 12 is an explanatory sectional view for explaining a further metallic gasket according to the first embodiment of the present invention.

Further, in the embodiment mentioned above, the height of the convex portion 14a of the full bead 14 is made a little higher than the first thickness-increased portion X and substantially equal to the height of the elastic sealing material 24 fixed to the convex portion 14a, and the height of the convex portion 15a of the full bead 15 is made a little higher than the second thickness-increased portion C. However, these are not necessarily required, and for example, as shown in FIG. 12, the height of the convex portion 14a of the full bead 14 may be made a little lower than the first thickness-increased portion X so that the full bead 14 is embedded in the elastic sealing material 24, and though this is not shown graphically, the convex portion of the full bead may protrude from the elastic sealing material 24. The same applies to the half beads, too.

Further, in the embodiment mentioned above, the surface of the elastic sealing material 24 fixed to the convex portion side of the full bead or the half bead is made substantially parallel with the flat surface of the base plate 11, but this is not necessarily required, and as long as the elastic sealing material 24 can be compressed and deformed in cooperation with the bead, various shapes may be adopted. In other words, the compressed amount is set so as not to cause compression fracture, various shapes may be adopted for the sealing material.

Further, in the above-mentioned embodiment, the elastic sealing material 24 filled in the concave portion of the half bead or the full bead is made substantially flush with the flat surface of the base plate 11, but as long as the elastic sealing material 24 is compressed and deformed in the through-thickness direction in cooperation with the bead, the elastic sealing material 24 may have a slightly rough surface with respect to the flat surface of the base plate 24. For example, as shown in FIG. 18, the elastic sealing material 24 filled in the concave portion of the full bead 14 may have a groove 24a formed therein to permit the elastic sealing material 24 to deform easily.

Figure 15:
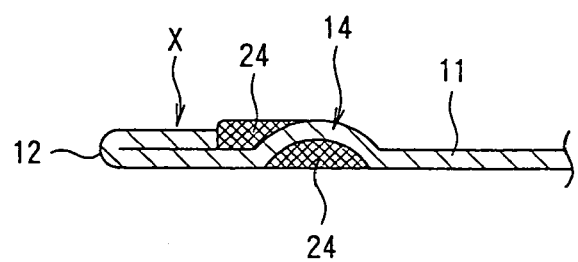
FIG. 15 is an explanatory sectional view for explaining an additional metallic gasket according to the first embodiment of the present invention.
Figure 16:
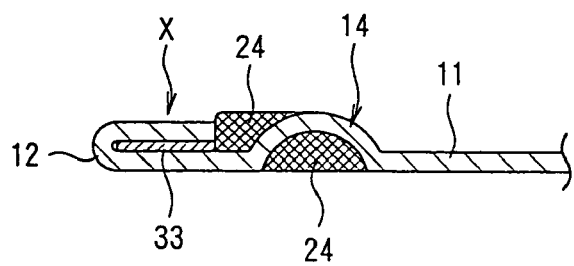
FIG. 16 is an explanatory sectional view for explaining a still additional metallic gasket according to the first embodiment of the present invention.

Further, in the above-mentioned embodiment, description has been made of a case where the elastic sealing material 24 fixed to the convex portion side of the full bead is disposed at both sides in the width direction of the convex portion, but this arrangement is not intended as a definition of the limits of this invention, and as shown in FIGS. 15 and 16, the elastic sealing material 24 fixed to the convex portion side of the full bead 14 may be placed only on the combustion chamber opening 12 side of the convex portion 14. By this arrangement, the elastic sealing material 24 (rubber, for example) on the convex portion side is prevented from being exposed to cooling water or oil to thereby improve durability, and this structure is most suitable when the full bead 14 is close to a bolt hole 16 or a water hole 17. The width of the bead may be varied in the circumferential direction to adjust the surface pressure.

Figure 18:
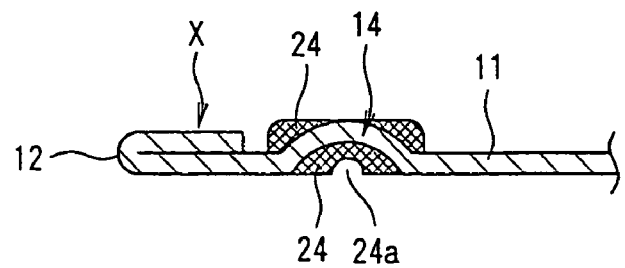
FIG. 18 is an explanatory sectional view for explaining yet another metallic gasket according to the first embodiment of the present invention.

Further, though not shown in FIGS. 4 to 12, 15 to 18, needless to say, it is possible to bore molding-material passages 21 in the full beads 14, 15, 19 and 20 and the half beads 44 and 45 in a metallic gasket shown in FIGS. 15 and 18, 1qand carry out simultaneous forming of a sealing material on the convex portion side and on the concave portion side.

In each of the above-mentioned embodiments, the elastic sealing material 24 has been filled in the concave portion of the bead so as to be substantially flush with the flat surface of the base plate 11 before the cylinder block and so on are fastened together by clamping bolts. Alternatively, it is possible to fill the concave portion of the full bead with an elastic sealing material in an amount substantially equal to the capacity of the concave portion, and arrange for the elastic sealing material 24 in the concave portion to be compressed and deformed so as to be substantially flush with the flat surface of the base plate 11 when the engine is assembled by fastening by clamping bolts.

Further, not shown in FIGS. 2-8, 10-12, and 15-18, a lubricant 40, such as molybdenum disulfide, which provides sealing and sliding properties, may be applied to one or both surfaces of the base plate 11 to prevent fretting caused by displacement or knocking by a thermal expansion difference between the engine and the gasket, or vibration amplitude as shown in FIG. 9.

Figure 13:
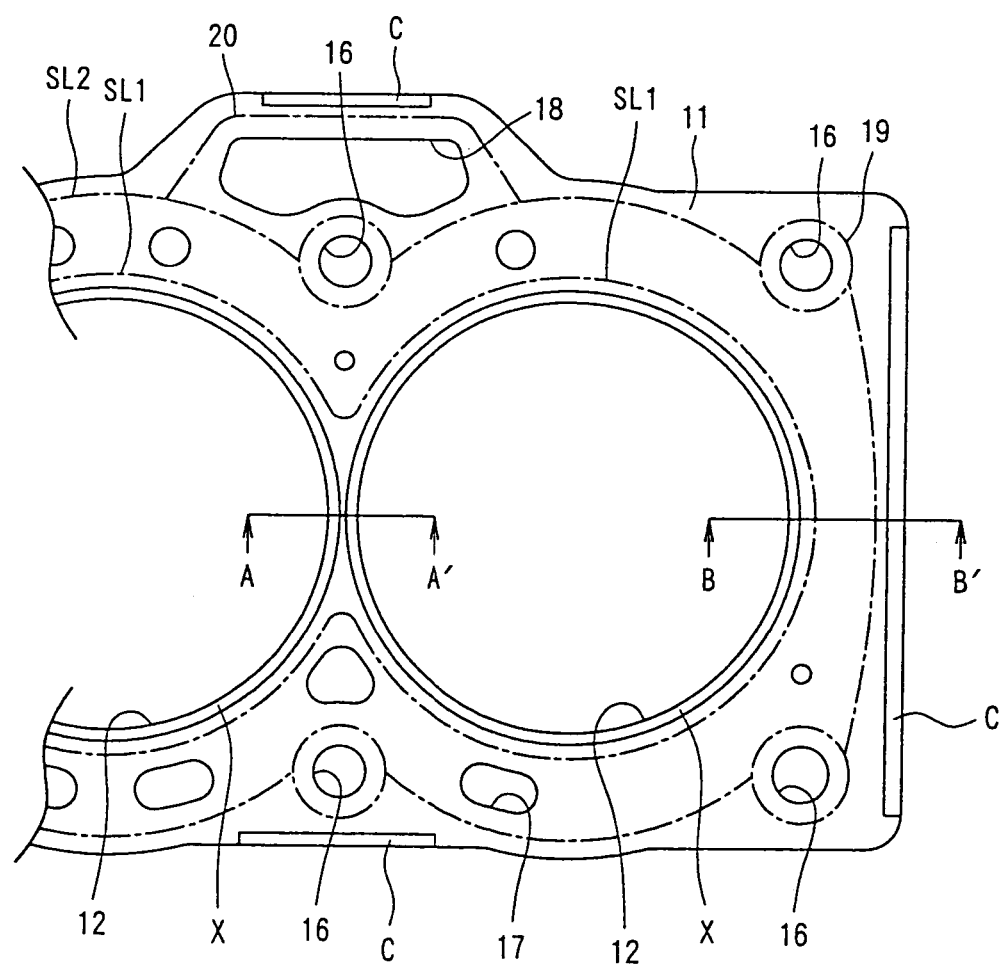
FIG. 13 is a plan view of an essential part for explaining a still further metallic gasket according to the first embodiment of the present invention.
Figure 14:
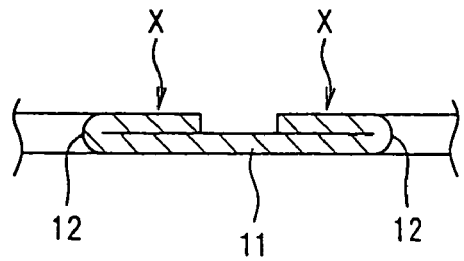
FIG. 14 is a sectional view taken along the line A-A in FIG. 13.

Further, in the above-mentioned embodiment, description has been made referring to a case, for example, where the full bead 14 is provided on the radially outer side of the first thickness-increased portion X at each combustion chamber opening 12, but this invention is not limited to this structure, and as shown in FIGS. 13 and 14, it goes without saying that this invention can be applied to a type of metallic gasket in which the full bead 14 cannot be placed between the combustion chamber openings 12 because the distance between cylinders (combustion chamber openings) has come to be narrow by weight-saving and down-sizing by the trend toward all-aluminum and high-powered automobiles.

Figure 19:
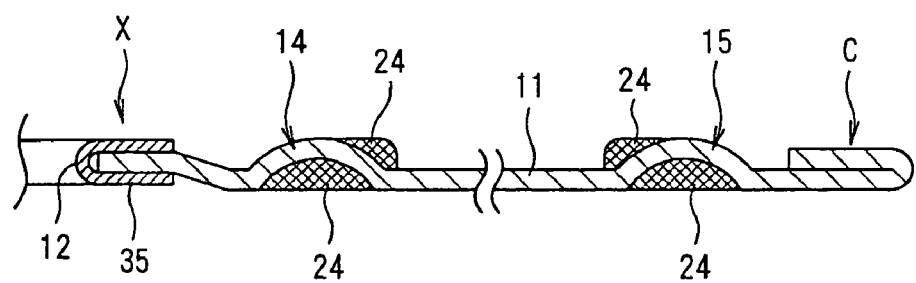
FIG. 19 is an explanatory sectional view for explaining a further metallic gasket according to the first embodiment of the present invention.

As in the example shown in FIG. 15 or the like, to use the elastic sealing material 24 only on the thickness-increased portion X side is disadvantageous from a standpoint of inhibiting deformation of the base plate by means of the spring force of the elastic sealing material on the concave portion side. From a standpoint of inhibiting a decrease in sealing pressure by restraining the deformation, when an elastic sealing material is placed only on one surface side, it is desirable to locate the elastic sealing material 24 on the side opposite the thickness-increased portion X or C as shown in FIG. 19. This is because the thickness-increased portion X or C inhibits the base plate from being deformed on the thickness-increased portion X or C side. This applies in the vicinity of the portions fastened by bolts.

Figure 20:
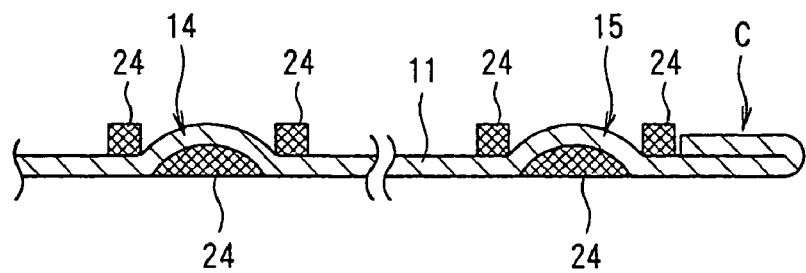
FIG. 20 is an explanatory sectional view for explaining a still further metallic gasket according to the first embodiment of the present invention.

Further, in the above-mentioned embodiment, the elastic sealing material 24 is applied to the whole surface or the one-side surface of the convex portion of the metal bead 15, which, however, is not intended as a definition of the limits of the invention. As shown in FIG. 20, the elastic sealing material 24 may be applied to the flat portion of the base plate which is continuous to the metal bead 15, which, however, makes the bead width wider and the elastic sealing material is more likely to separate because of its not being fixed to the surface of the convex portion.

Next, a second embodiment of the present invention will be described with reference to the accompanying drawings.

Figure 21:
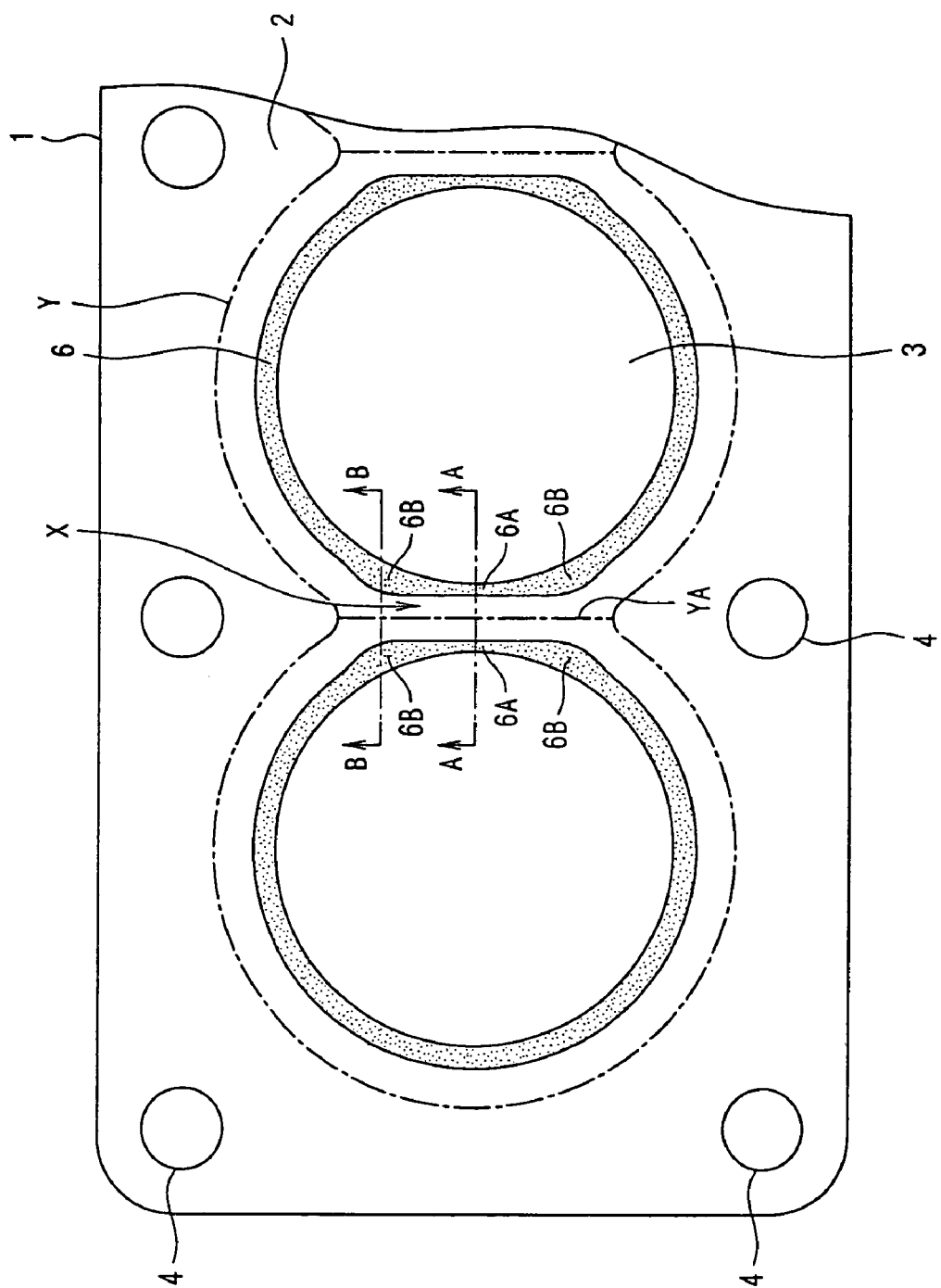
FIG. 21 is a plan view for explaining a metallic gasket according to a second embodiment of the present invention.
Figure 22:
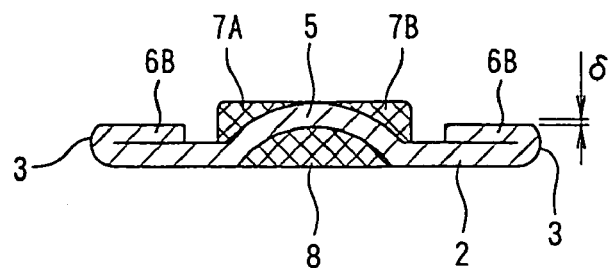
FIG. 22 is a sectional view taken along the line B-B in FIG. 21.
Figure 23:
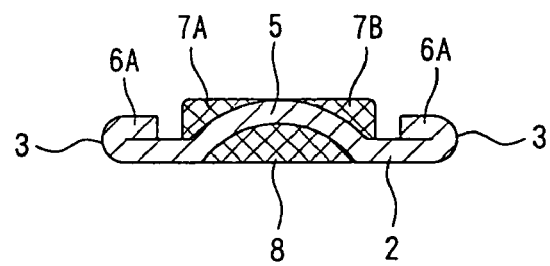
FIG. 23 is a sectional view taken along the line A-A in FIG. 21.

FIG. 21 is a plan view for explaining a metallic gasket 1 according to the second embodiment of the invention. FIG. 22 is a sectional view taken along the line B-B, in other words, at an end position of the boundary area X in FIG. 21. FIG. 23 is a sectional view taken along the line A-A, in other words, at the center position of the boundary area X in FIG. 21.

Description will start with the structure of the metallic gasket according to this embodiment.

The metallic gasket 1 according to this embodiment is an example of a metallic gasket 1 sandwiched between opposing joint surfaces of the cylinder head and the cylinder block of an internal combustion engine of a multicylinder structure.

As a material for the base plate 2 of the metallic gasket, it is possible to adopt as necessity requires metal plate, such as stainless steel, soft steel or aluminum. Here, in order to provide a less expensive metallic gasket 1, suppose that soft steel plate of low rigidity is used.

As shown in FIG. 21, in the center area of the base plate 2, a plurality of large openings for combustion chamber bores 3 are arranged in the longitudinal direction. Further, a plurality of bolt holes 4 are formed in the area along the outer circumference of the base plate 2.

The region of the internal circumference encircling the opening end of each combustion chamber opening 3 is folded back upwardly to form a thickness-increased portion 6 of largest thickness, by which a thickness difference is provided with respect to the remaining portions. In a boundary area X between the adjacent combustion chamber openings, because the clearance between the combustion chamber openings 3 is minimum at the center position, the width of the thickness-increased portion 6A on each side of the boundary at the center position is set as an extremely small value and the width of the thickness-increased portion 6 is made to become wider toward each end of the boundary area X, and at each end of the boundary area X, the width of the thickness-increased portion 6B on each side of the boundary is made wider than in other parts of the area X to make up for the narrow thickness-increased portion in the center position of the boundary area X.

Further, on the ground that each end side of the boundary area X is close to the bolt hole 4, the height of the thickness-increased portion 6 at each end of the boundary area X is made slightly lower than in the center. Position (the end portion is lower by in FIG. 22) to thereby equalize the surface pressure applied to the thickness-increased portion 6 in the circumferential direction (in the extending direction) around the combustion chamber opening. In other words, looking at the thickness-increased portion 6 at the boundary area X, for example, one can see the height at 6A on each side of the boundary at the center position is made relatively higher than the height of the end portion at 6B so that a required sealing pressure can be generated in the thickness-increased portion 6A of narrow width.

Here, in this embodiment, because soft steel can be adopted as material for the base plate 2, it is easy to fold back the base plate to form the thickness-increased portion 6 and change the thickness-increased portion 6 easily.

Further, on the outer side of the vicinity of the thickness-increased portion 6, a seal line Y of the bead of an endless circle is set to encircle each combustion chamber opening 3, and a convex full bead 5 is formed along the seal line Y by bending the base plate 2.

The seal lines Y converge into one seal line YA shared by the adjacent combustion chamber openings 3 when the seal lines run into the boundary area X between the adjacent combustion chamber openings 3.

Elastic sealing material 7A, 7B are fixed to the surface of the base plate 2 on the convex portion side of the full bead 5, and a similar elastic sealing material 8 is filled in the concave portion on the reverse side of the convex portion side. The elastic sealing material 7A, 7B and 8 are made of a heat-resistant and elastic material, such as a rubber material of fluororubber, NBR or silicon rubber, a resin material or the like.

The elastic sealing material 7A and 7B fixed to the specified sides of the convex portion of the full bead 5 are arranged to cover both sides of the surface of the convex portion and also slightly cover the flat area continuous to the convex portion. In this embodiment, the total width of the elastic sealing material 7A and 7B on the convex portion side is set to be a little wider than the width of the bead. That width may be about equal to the bead width. The height of the elastic sealing material 7A, 7B is made substantially equal to the height of the bead.

Elastic sealing material 7A, 7B which has a height equal to the height of the bead 5 may be applied to the flat area of the base plate continuous to the convex portion of the bead 5 as described above, but it is desirable to set the width of the rubber bead consisting of the elastic sealing material 7A, 7B so as to be not more than about 1.5 times the width of the bead 5. The height of the bead 4 and the elastic sealing material 7A, 7B is set so that the compression rate of the elastic sealing material 7A, 7B and 8 on both surfaces is within 35% when compressed to the height of the thickness-increased portion to thereby prevent compression fracture of the elastic sealing material 7A, 7B and 8.

Suppose that a high-pressure gas from the combustion chamber bore 3 side leaks through the minute channels formed as tool marks on the joint surfaces facing the thickness-increased portion 6. Even if this occurs, the rubber bead consisting of the elastic sealing material 7A, 7B and 8 can completely seal the leak of high-pressure gas because those channels are filled by the elastic sealing material 7A, 7B when those sealing material underwent elastic deformation along the seal line Y of the bead 5.

Even if cooling water intrudes from the outer side (outer periphery side) of the rubber bead, the flexible rubber bead can seal off the water by completely closing even the tool marks. The elastic sealing material 8 filled in the concave portion is not directly exposed to cooling water and does not deteriorate. On the other hand, the elastic sealing material 7A, 7B on the convex portion side contacts at their end faces which are close to the cooling water hole. Even when the portion of the sealing material deteriorates by contact with the cooling water from using an undesignated cooling water and the performance of the elastic sealing material 7A, 7B, that part of the elastic sealing material 7A, 7B on the inner side of the bead 5 is separated by the convex portion of the bead 5 and does not directly contact the cooling water. All in all, a complete seal can be guaranteed for a long period of time. Note that the action of the cooling water mentioned above is its action along the seal line other than at the boundary area X.

Further, with regard to the rubber bead width, assuming that the width of the narrow elastic sealing material 8 on the concave portion side is about 2.5 mm, since the width of the convex portion side can be designed to be wider than that, as long as the casting-blowholes are not wider than the bead width, they can be sealed. Even if flaws made in transit has been formed in a manner to run across the bead width, a complete seal can be obtained by closing up the flaws on the seal surface by area seal using the rubber bead.

Further, in this embodiment, since the seal seals the joint by a composite spring of the bead 5 made of soft steel and the rubber bead made of soft elastic sealing material 7A, 7B, an extremely high surface pressure cannot be expected, but the surface pressure can be adjusted to some extent by increasing the width of the rubber bead or by increasing the hardness of rubber. Since both contact surfaces are formed by soft elastic sealing material 7A, 7B or 8, and the gasket factor can be decreased, with the result that large load is not required, the total fastening load, in other words, the fastening axial tension of bolts can be reduced.

Further, as rust-preventive measures of the base plate 2, it is possible to adopt plating finish for the end faces of the base plate 2 and the sectional areas of the holes or apply a ultra-thin rubber coating or molding coating to all parts that may contact cooling water and the parts located on the outer side of the bead 5, which may suffer corrosion.

As has been described, in this embodiment, even if the clearance between adjacent combustion chamber openings 3 becomes increasingly smaller by reductions in size and weight of engines or if blowholes occur on the joint surfaces by progressive use of aluminum, it is possible to securely apply an effective seal by the bead 5 and by elastic sealing material 7A, 7B or 8, and it is also possible to reduce the fastening axial tension. Since it has become possible to adopt soft steel of low rigidity for the base plate 2, the workability of the metallic gasket 1 can be improved.

More specifically, the bead 5 is formed on the base plate 2 of soft steel and the rubber bead consisting of elastic sealing material 7A, 7B and 8, which have elasticity, is formed on both surfaces of the bead 5, and spring forces are generated by the compression-deformed amounts of the bead 5 of the base plate 5 and the rubber bead. The compression-deformed amounts of the base-plate bead 5 and the rubber bead are limited by the thickness of the thickness-increased portion 6 formed by folding back the peripheral end portion on the combustion chamber opening 3 side of the base plate. Owing to the use of the base plate 2 made of soft steel material of low rigidity, the hardness by work hardening does not rise much, and though spring forces are generated by the rubber bead applied to both surfaces of the bead 5, because the rubber bead is made of soft rubber, deformation load is small, and most of the load is designed to be received by the thickness-increased portion. Consequently, while the engine is operating, vibration amplitude is smaller than before, and there is no worry about fatigue failure. The height of the thickness-increased portion is varied partly along the internal circumference of the combustion chamber opening 3, and for example, that height is low in the vicinity of bolts, and is made high between the bolts and between the bores to thereby average the fastening surface pressure in the region encircling the combustion chamber opening 3. Accordingly, a high pressure can be sealed by the width of the thickness-increased portion of the minimum width in engines which have a narrow clearance between the combustion chamber openings 3. High-pressure gas is sealed by the thickness-increased portion while low-pressure cooling water and oil pressure are sealed by the rubber bead line. The rubber bead line is capable of adapting itself to the surfaces of the engine, the gasket factor is small, so that total load can be reduced.

The rubber bead line, having a wide width, can seal casting-blowholes of sizes falling within the width. The flaws that run through the range of the bead 5 can be sealed by the elastic sealing material 7A, 7B and 8 that come into close contact with the flaws when they are bent. Further, since the base plate 2 is soft steel and less expensive than stainless steel, it is possible to provide a high-performance gasket at low price.

Figure 24:
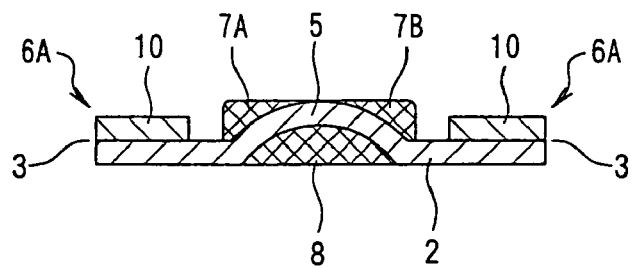
FIG. 24 is a sectional view showing the thickness-increased portion in another structure according to the second embodiment of the present invention.

As shown in FIGS. 22 and 23, when the thickness-increased portion 6 is formed by bending the peripheral end portion on the combustion chamber opening 3 side of the base plate 2, the width of the thickness-increased portion becomes smaller by an amount taken up to form the radius R of the folded portion (the portion facing the combustion chamber bore 3). In consideration of this, to increase the width of the thickness-increased portion to thereby increase the seal area by the thickness-increased portion, instead of forming the thickness-increased portion by bending the end portion, it is only necessary to fix a separate subplate 10 to the base plate 2 as shown in FIG. 24. In this case, the width of the thickness-increased portion can be increased by an amount which would otherwise be taken up to form the rounded portion.

Figure 25:
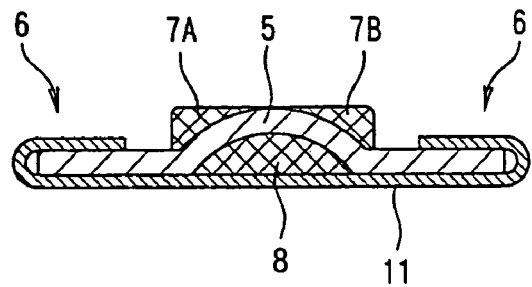
FIG. 25 is a sectional view showing the thickness-increased portion according to yet another structure according to the second embodiment of the present invention.

Further, the thickness-increased portion may be formed as shown in FIG. 25, in which the subplate 11 is bent at each end of it to increase the thickness.

Figure 26:
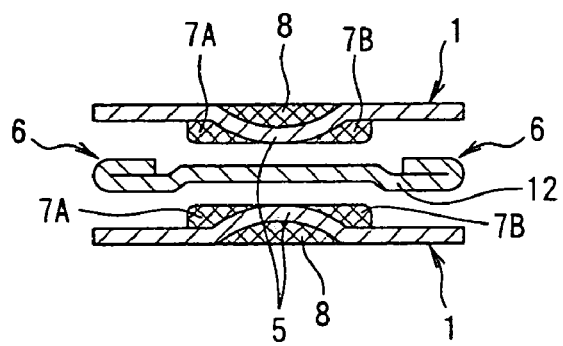
FIG. 26 is a sectional view showing an example of a gasket formed in a multi-layer structure.
Figure 27:
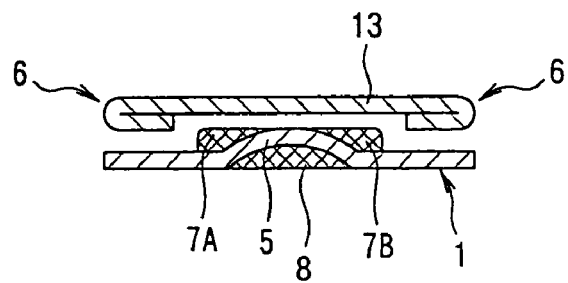
FIG. 27 is a sectional view showing an example of a gasket formed in a multi-layer structure.
Figure 28:
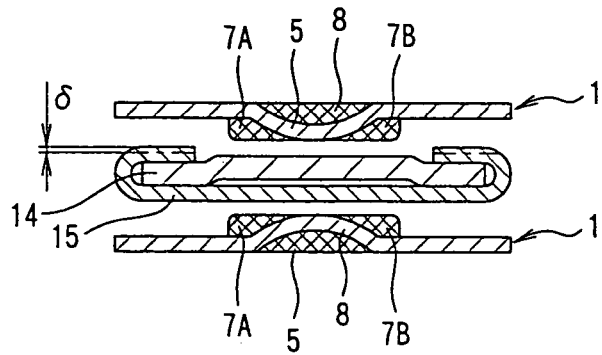
FIG. 28 is a sectional view showing an example of a gasket formed in a multi-layer structure.

When the metallic gasket 1 requires a larger thickness, a plurality of plates are stacked as shown in FIGS. 26 to 28.

The structure of the gasket in FIG. 26 is formed as follows. In two metallic gasket 1, each having formed therein a full bead 5, to which elastic sealing material 7A, 7B and 8 are attached, as described above, the full beads 5 are arranged with convex portions facing each other, the flat surfaces on the concave portion side of the metal beads 5 are brought into contact with the joint surfaces, and the subplate 12, which has a folded thickness-increased portion formed on each side, is sandwiched between the two metallic gaskets 1. In the subplate 12, the whole areas of the end portions contacting the elastic sealing material 7A, 7B are made to protrude at the folded end portions at opposite ends, and the deformed amount of each of the beads 5 of the couple of metallic gaskets 1 is thereby adjusted to not more than 35%, for example.

The subplate 12 may be formed by soft steel, and by partly varying the thickness of the folded, thickness-increased portion, the surface pressure is equalized after fastening of bolts. The required thickness of the whole gasket is adjusted according to the thickness of the subplate 12.

In the structure under discussion, a high pressure gas from the combustion chamber bore 3 or cooling water that has entered from the outer periphery side infiltrates between the pair of metallic gaskets (more precisely, between each metallic gasket 1 and the subplate 12). Therefore, this gasket is not affected by the blowholes or tool marks on the joint surfaces of the cylinder head or the like, and can exhibits the same effects as described above. In this case, it is possible to secure an enough thickness for the elastic sealing material 7A and 7B, thus increasing the gasket adaptability to deformation. Those effects are obtainable also with the examples in FIGS. 27 and 28.

The structure of the gasket in FIG. 27 is such that a subplate 13 having a folded, thickness-increased portion is disposed to face the convex portion side of the bead 5 of the metallic gasket 1, the metallic gasket 1 has a full bead 5 holding the elastic sealing material 7A and 7B, mentioned above.

The structure of the gasket in FIG. 28, which resembles the structure in FIG. 26, has two subplates 14 and 15 sandwiched between the pair of metallic gaskets 1. Out of the two subplates 14 and 15, one subplate 14 has a step, that is, a difference in surface level formed at each end portion thereof, and the other subplate 15 has each end portion thereof folded back, and each of the folded-back end portion is located where there is the lower-level portion. An upper half of the thickness of the folded-back end portion of the subplate 15 serves as a stopper against the upper bead and a lower half of it serves as a stopper against the lower bead. (The deformed amount of the lower rubber bead is restrained by elimination of the gap between the two subplates 14 and 15.)

Note that the above-mentioned examples are not intended as a definition of the limits of the invention but this embodiment is capable of developing limitlessly by combinations of this technology of the thickness-increased portion and new rubber beads.

With regard to the structure, operation and effects of the second embodiment, those mentioned in the first embodiment apply.

Next, a third embodiment of the present invention will be described with reference to the accompanying drawings.

Figure 29:
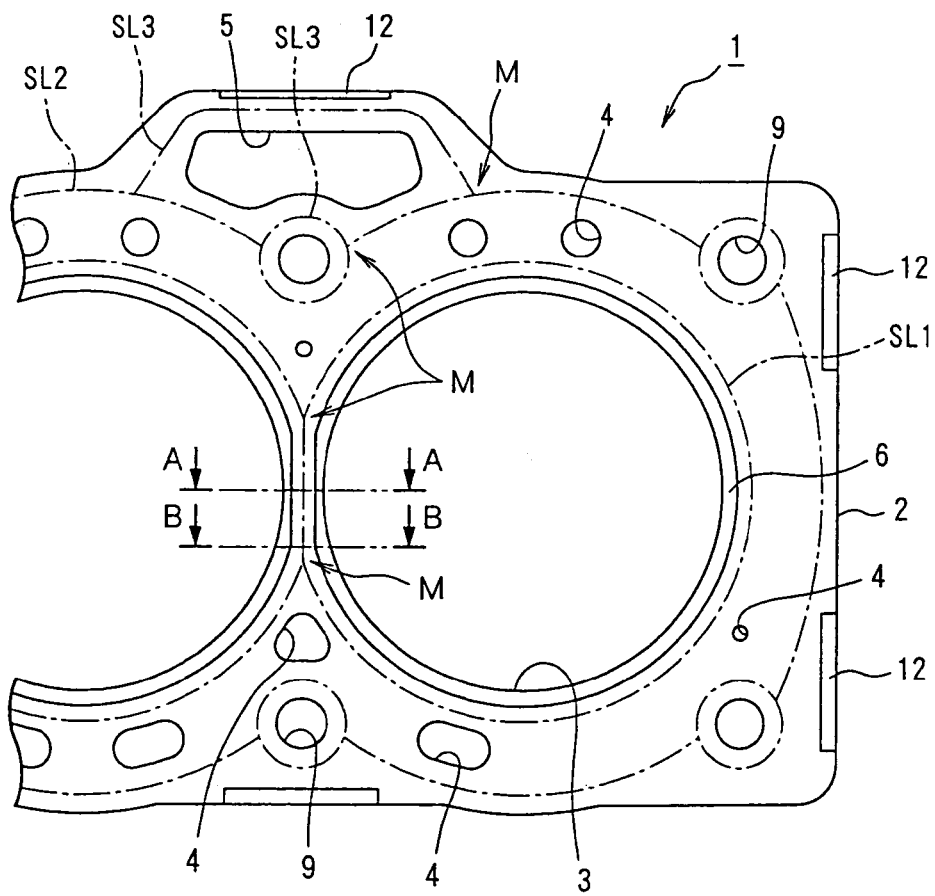
FIG. 29 is a plan view for explaining a metallic gasket according to a third embodiment of the present invention.
Figure 30:
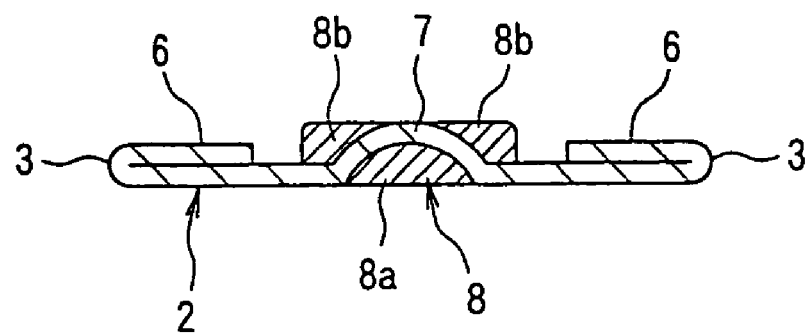
FIG. 30 is a sectional view taken along the line A-A in FIG. 29.
Figure 31:
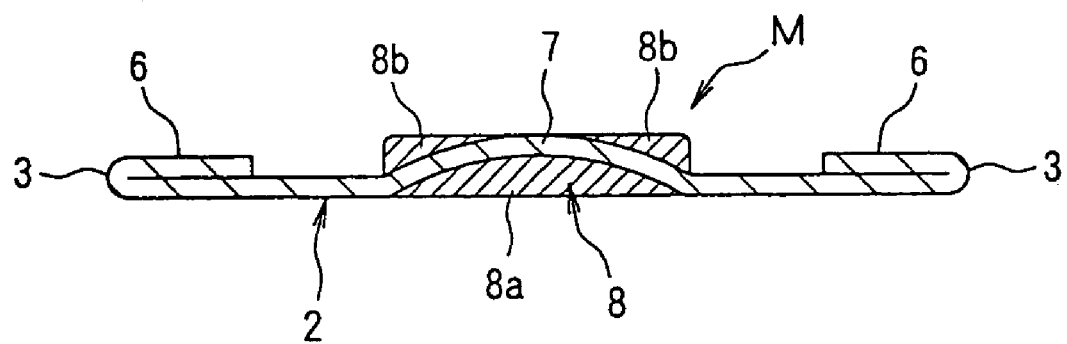
FIG. 31 is a sectional view taken along the line in FIG. 29.
Figure 32:
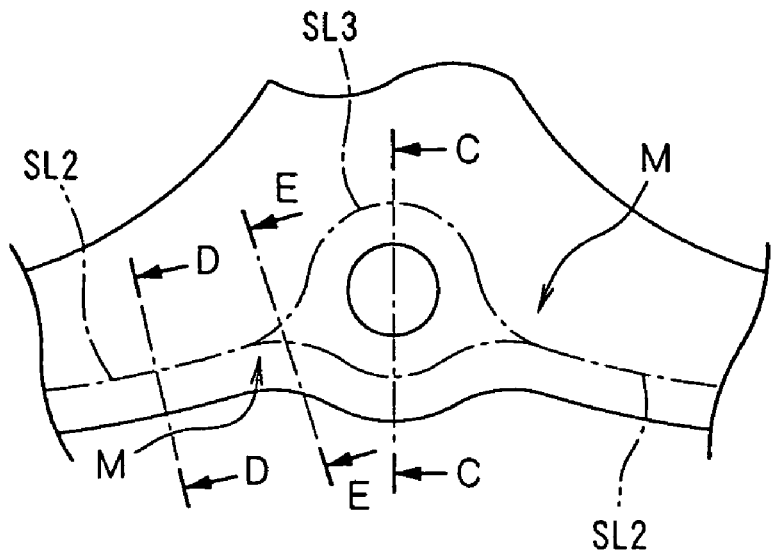
FIG. 32 is a diagram showing an example in which the bead diverges from a full bead into half beads which converge into a full bead.

FIG. 29 is a plan view for explaining a metallic gasket in the third embodiment. FIG. 30 is a sectional view taken along the line A-A in FIG. 29. FIG. 31 is a sectional view taken along the line B-B in FIG. 29.

Description will start with the structure of a metallic gasket according to the third embodiment.

The metallic gasket 1 is an example of a cylinder head gasket. The base plate 2 of the metallic gasket 1 is made of thin metal plate, such as stainless steel, soft steel and aluminum with low hardness.

In the center of the base plate 2 there are formed combustion chamber openings 3 aligned to each other in the longitudinal direction, and a first thickness-increased portion 6 is formed by upwardly folding back the end portion of the internal circumference of the combustion chamber opening 3. This first thickness-increased portion 6 is used to seal off a high-pressure gas of the combustion chamber.

A first seal line SL1 is provided on the outer side of the first thickness-increased portion 6 in a manner to endlessly encircle each combustion chamber opening 3. Because the first seal lines SL1, each encircling the adjacent combustion chamber opening 3, have to become narrow in the boundary area between the adjacent two combustion chamber openings 3, the first seal lines SL1 merge or split at the inlet or outlet of the boundary area, and therefore the seal lines SL1 share one seal line in the boundary area. The part where two seal lines come together or split forms a converge-diverge area M.

A plurality of cooling water holes 4 are formed in the base plate 2 on the outer side of the first seal line SL1, and a second seal line SL2 is provided in a manner to endlessly encircle the whole a plurality of cooling water holes 4 and combustion chamber opening 3. Bolt holes 9 and an oil hole 5 are formed on the outer side of the second seal line SL2, and third seal lines are formed in a manner to endlessly encircle the bolt holes 9 and the oil hole 5. The second and third seal lines SL2 and SL3, where they come together, are made to merge into one seal line. In other words, the part where the seal lines come together or split forms a converge-diverge part M.

In part of the external end portion of the base plate 2, second thickness-increased portions 12 are formed by upwardly folding back the end portion. The height of the second thickness-increased portion 12 is set to be a little lower than the minimum height in the first thickness-increased portion 6 by forging.

The number of the converge-diverge parts M of the seal lines increases when the seal lines are designed to be short in length or an enough width of seal line is hard to obtain for design reasons.

Figure 43:
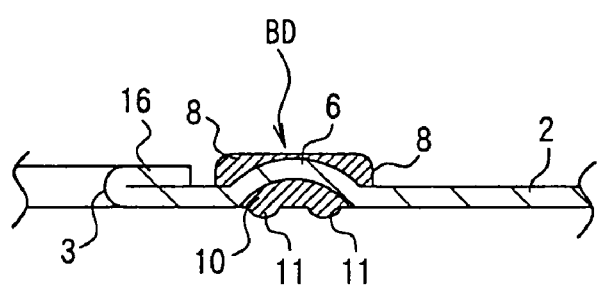
FIG. 43 is a still further example of a protrusion formed.
Figure 44:
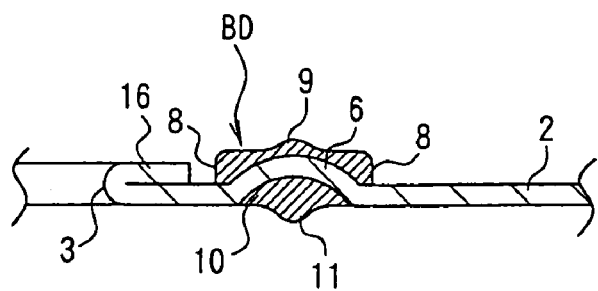
FIG. 44 is a still other example of a protrusion formed.
Figure 45:
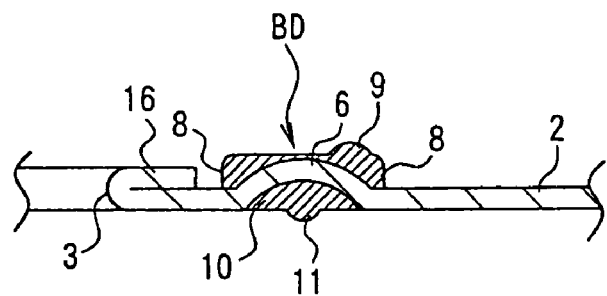
FIG. 45 is a yet further example of a protrusion formed.
Figure 46:
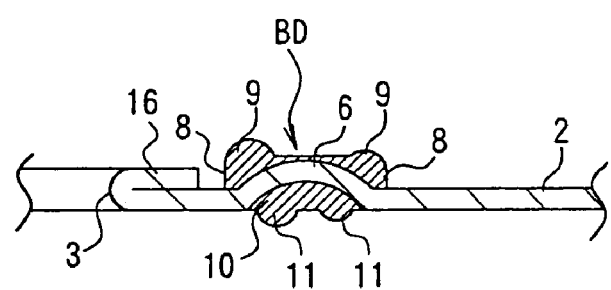
FIG. 46 is an additional example of a protrusion formed.
Figure 47:
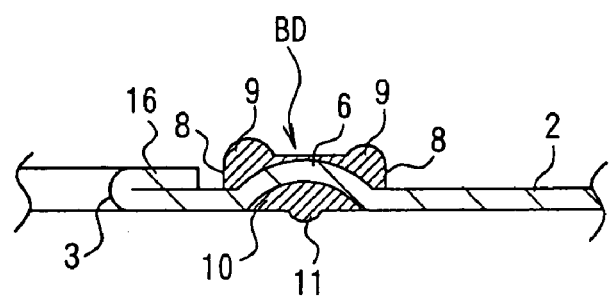
FIG. 47 is a still additional example of a protrusion formed.

The bead width of the metal bead 7 is designed to be constant toward the converge-diverge part M insofar as possible as shown in FIG. 43. Needless to say, this example is not intended as a definition of the limits of the invention.

The bead that forms the seal line is a composite body of a metal bead 7 and a rubber bead 8 as shown in FIGS. 30 and 31.

The metal bead 7 according to the third embodiment is a full bead formed by bending the base plate 2 so that the bead protrudes in a convex form only on one surface side (upper side) of the base plate 2. The height of the metal bead is set to be higher than the first thickness-increased portion 6, so that the bead undergoes elastic deformation in the through-thickness direction, thereby generating a sealing pressure.

The rubber bead 8 comprises an elastic sealing material 8b fixed to the surface of the base plate 2 on the convex portion side of the metal bead 7, and an elastic sealing material 8a filled in the concave portion located on the reverse side of each convex portion of the metal bead 7. The elastic sealing material 8a and 8b may be formed by a rubber material, such as fluororubber, NBR and silicon rubber, a resin material, or the like, which has heat resistance, corrosion resistance, weatherability and elasticity.

The elastic sealing material 8b fixed to the convex portion side of each metal bead 7 is fixed on the surface of the base plate 2 in a manner to cover at least both sides of the width of the metal bead 7. The height of the elastic sealing material 8b fixed to the convex portion side of each metal bead 7 is set to be equal to or substantially equal to the height of the convex portion of each metal bead 7, and the top surface is set to be substantially parallel to the flat surface of the base plate 2. The height of the elastic sealing material 8b may be set to be slightly higher than the height of the convex portion of the metal bead 7. However, the height of the elastic sealing material 8b should be a height at which the compression-deformed amount regulated by the height of the first thickness-increased portion 6 can be restrained to not more than 35% (the compression-deformed amount without subject to buckling, which is already known for the material).

On the other hand, the amount of the elastic sealing material 8a filled in the concave portion of each metal bead 7 is set to be substantially equal to the capacity of the concave portion and substantially flush with the flat surface of the base plate 2.

The width of the metal bead 7 along the bead line is substantially constant, and generally the width of the metal bead 7 becomes relatively wider at the converge-diverge part M than in the remaining portions of the bead. (Refer to FIGS. 30 and 31) For this reason, as long as the metal bead 7 is concerned, the spring force at the converge-diverge part M, but as shown in FIG. 31, the amount of the elastic sealing material 8a and 8b filled in the concave portion is considerably large, so that the deformation load at the converge-diverge part M becomes large.

In view of this, with regard to the rubber bead 8 on the convex portion side of the metal bead 7, the elastic sealing material 8a and 8b are applied to the convex portion slope of the metal bead 7 and also to the flat surface of the base plate 2 in the remaining portions of the bead, but in the converge-diverge part M, the elastic sealing material 8a and 8b are applied only to the convex portion slope of the metal bead 7 to thereby decrease the deformation load. Note that for the absolute width of the rubber bead 8, as shown in FIG. 31, it is wider at the converge-diverge part M to compensate for a decrease in the spring force of the metal bead 7 which is made wide.

As has been described, the ratio of the width of the rubber bead 8 to the width of the metal bead 7 is made different between in the converge-diverge part M and in the remaining portions of the bead to thereby equalize the sealing pressures along the seal line and at the converge-diverge parts M. In the above example, the ratio of the width of the rubber bead 8 to the width of the metal bead 7 is set so as to be smaller at the converge-diverge parts M.

As stated above, only by adjusting the width of the rubber bead 8 capable of easy width adjustment, the sealing pressure along the seal lines can be equalized regardless of the presence of many converge-diverge parts or without any need to worry about the figuration of the converge-diverge part of the metal bead 7 along the bead line.

The rubber bead 8 having sealing material formed on both surfaces of the metal bead 7 has by itself a lower spring force than the bead of high-hardness base plate though this depends on the hardness of the sealing material. However, when the rubber bead 8 and the metal bead 7 are combined as a composite bead, the composite bead provides an area seal by the elastic sealing material 8a and 8b, which have a better adaptability to the joint surfaces of the engine, so that the gasket factor can be restricted to a small value. In other words, if the hardness of the base plate 2 is decreased and the spring force of the metal bead 7 becomes smaller, there is no problem, and accordingly there is no need to worry about cracks.

As described above, when the gasket factor becomes smaller, because the gasket factor of 2 to 4 is sufficient with the margin of safety ratio taken into consideration, the total fastening load can be decreased.

An area seal formed by the elastic sealing material 8a and 8b is applied, which offers significant sealing effects covering the processing roughness of the joint surfaces, flaws running across the bead width, and blowholes that occur during aluminum casting.

For the metal bead 7 of the third seal line SL3 along the outer periphery of the base plate 2, where the seal width is narrow, a metal bead 10 in the form of a half bead of a stepped structure is sometimes adopted. More specifically, after the full bead in FIG. 33 becomes wider in the converge-diverge part as shown in FIG. 34, the bead splits into two half beads 10 of a stepped structure as shown in FIG. 35, and the two half beads merge into one full bead.

Figure 33:
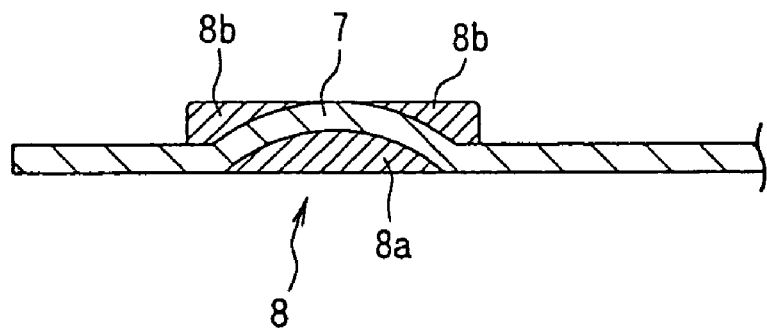
FIG. 33 is a sectional view taken along the line D-D in FIG. 32.
Figure 34:
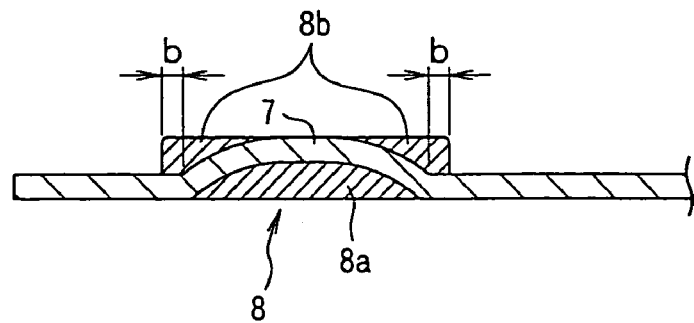
FIG. 34 is a sectional view taken along the line E-E in FIG. 32.
Figure 35:
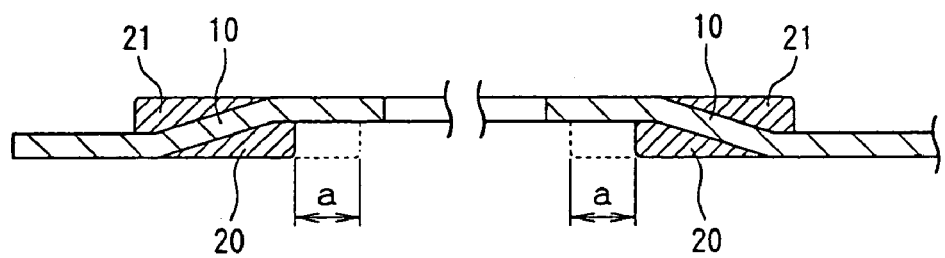
FIG. 35 is a sectional view taken along the line C-C in FIG. 32.

When a full bead splits into two half beads 10 which in turn converge as mentioned above, in view of the fact that at the time of compression, the elastic sealing material bends sideways and the spring force weakens, the width of the rubber portion is made relatively wide as shown in FIGS. 33 and 34 to thereby equalize the pressure.

At this time, it is desirable to widen the width of the rubber bead in the vicinity of the bolts.

In this embodiment, the thickness-increased portions is made to receive a greater part of the bolt-fastening load and a large pressure is applied to the first thickness-increased portion 6 encircling the combustion chamber opening 3 to thereby seal a high-pressure combustion gas by the first thickness-increased portion. Under this condition, by limiting the deformed amount of the bead to a proper value, it becomes possible to prevent compression fracture of the elastic sealing material 8a and 8b. It ought to be noted that for the metallic gasket 1 used for the parts where the fastening axial tension is low, the first and second thickness-increased portions 3 and 12 are not required.

The deformation of the combustion chamber bore is caused by differences in surface pressure between in the vicinity of bolts and in the region between the bolts depending on the rigidity of the engine when the cylinder block and the cylinder head are fastened together with a metallic gasket 1 is placed between the joint surfaces thereof.

Figure 36:
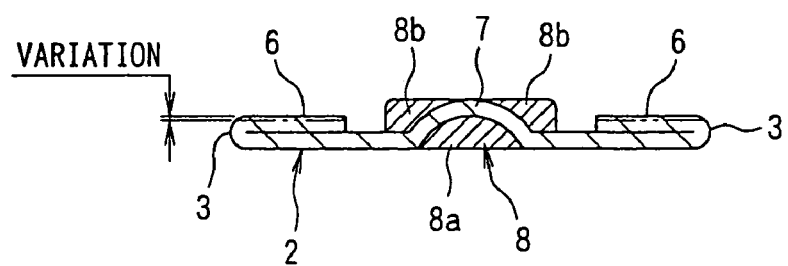
FIG. 36 is a reference diagram showing the up-down variation of the thickness-increased portion.

By partly varying the thickness of the region of the circumference of the first thickness-increased portion 6 facing a combustion chamber bore (Refer to FIG. 36) so as to equalize the sealing pressure along the extending direction of the above-mentioned portion 6, and thus the bore is prevented from being deformed to thereby maintain the roundness of the bore. The more the roundness of the bore is impaired, the larger the oil consumption and power loss will be.

A fourth embodiment of the present invention will be described with reference to the accompanying drawings.

Figure 37:
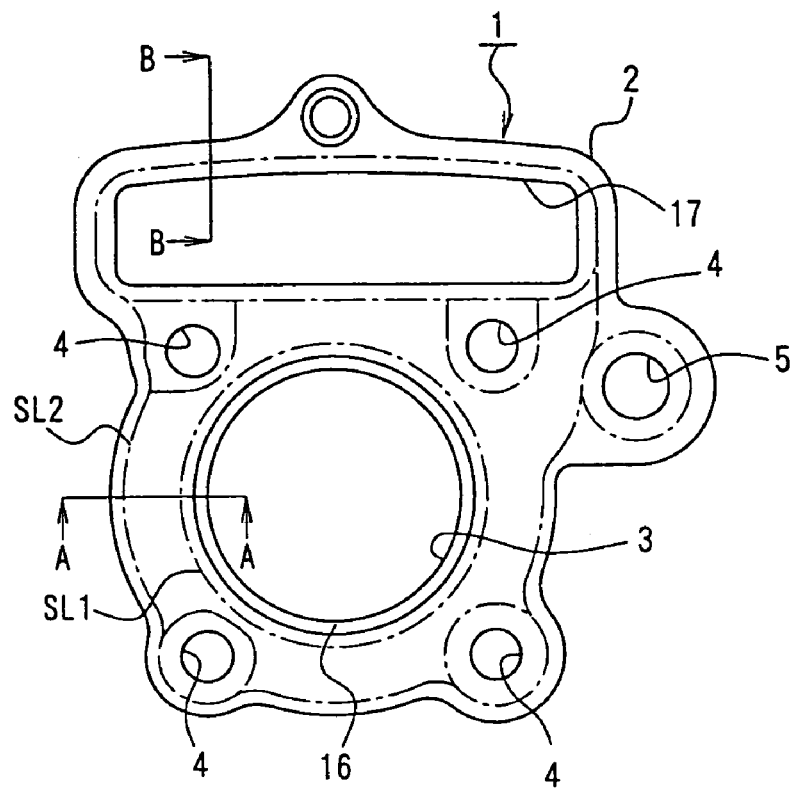
FIG. 37 is a plan view showing a metallic gasket according to a fourth embodiment of the present invention.

FIG. 37 is a plan view for explaining a metallic gasket 1 according to the fourth embodiment.

The metallic gasket 1 according to the present invention comprises a base plate 2 made of a metal plate, such as stainless steel or soft steel. In the basic concept of this embodiment, a sheet of base plate 2 is used. However, more than one base plate 2 may be used when occasion requires.

In the following, a case will be described where the metallic gasket 1 is formed by a sheet of base plate 2.

Description will be made of the structure, in which a combustion chamber opening 3 is formed almost in the center of the base plate 2. Bolt holes 4 and an oil hole 5 are formed on the radially outer side of the combustion chamber opening 3. A chain chamber hole 17 is also formed.

Figure 38:
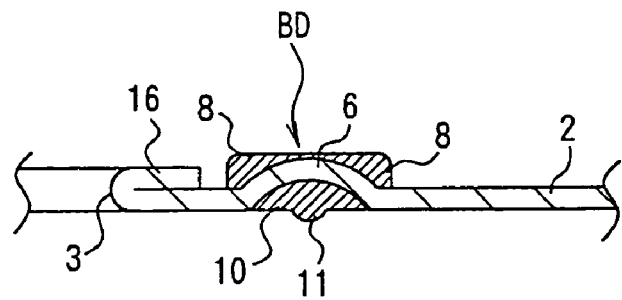
FIG. 38 is a sectional view taken along the line A-A in FIG. 37.

As shown in FIG. 38, the peripheral end portion on the combustion chamber opening 3 side of the base plate is upwardly folded back to form a thickness-increased portion 16 which is thicker than the remaining portions of the base plate. In this embodiment, the thickness-increased portion 16 is formed by folding back, but it may be formed by any of well-known methods, such as fixing a flat plate.

Seal lines SL1 and SL2 are arranged in a manner to encircle each of the holes, and along each of the seal lines SL1 and SL2a, a bead is formed.

Figure 39:
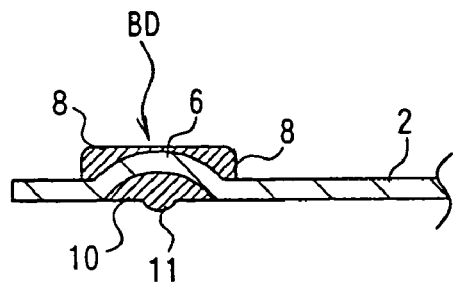
FIG. 39 is a sectional view taken along the line B-B in FIG. 37.

As shown in FIGS. 38 and 39, a bead BD in this embodiment is formed by combining a base plate 6 as a full bead and rubber beads 8 and 10.

The base-plate bead 6 is formed by bending the base plate 2 in the through-thickness direction, and is in a convex form on the thickness-increased portion side 16 so as to be higher than the thickness-increased portion 16.

The above-mentioned rubber bead is formed by a first elastic sealing material 10 filled in the concave portion of the base-plate bead 6, and a second elastic sealing material 8 fixed to the convex portion side of the base-plate bead 6.

The first elastic sealing material 10 is set in such a way that its flat surface is substantially flush with the underside of the base plate 2, and in substantially the center position of the bead width, a protrusion extending downwardly is formed along the seal lines SL1 and SL2.

The second elastic sealing material 8 is formed on the surface of the bead convex portion, extending slightly to a flat surface continuous to the convex portion. The height of the second elastic sealing material 8 is designed to be at substantially the same height as the base-plate bead 6 and to have a substantially flat surface (top surface).

Preferably, the width of the second elastic sealing material 8 is not more than 1.5 times the width of the base plate 6. If the width is too wide, load will be needlessly increased. The height of the second elastic sealing material 8 is preferably in a range of 0.9 to 1.1 the height of the base-plate bead 6.

The number of and the kinds of holes, such as bolt holes 4, and the positions of the seal lines SL1 and SL2 naturally differ with the kinds of the cylinder head and the cylinder block between which the metallic gasket 1 is disposed.

The metallic gasket 1 structured as described is mounted when it is sandwiched between the joint surfaces of the cylinder block and the cylinder head of an engine, the beads are deformed by the fastening force of the clamping bolts, so that a required sealing pressure is generated along the seal lines SL1 and SL2 to thereby seal oil and the like.

At the time of fastening, the compression-deformed amount of the bead is restricted by the thickness-increased portion 16 provided at the peripheral end portion of the base plate around the combustion chamber opening 3, a high surface pressure is generated at the thickness-increased portion 16, which thereby seals a combustion gas at high temperature and high pressure.

When no coating is applied to the surface of the thickness-increased portion 16 to provide the gasket at a low price, the thickness-increased portion 16 of the gasket comes into metal-to-metal contact with the machined surfaces (joint surfaces) of the engine, and consequently there is a tool-mark irregularity of 3 to 6 microns on the machined surfaces.

The explosion pressure by engine operation is not a constantly-applied pressure but a pulsating pressure; therefore, there is some pressure leakage from the thickness-increased portion 16 to the outer periphery side. However, the pressure is sealed by the bead BD on the outer side of the thickness-increased portion 16.

The bead BD according to this embodiment is so structured as to generate a required sealing pressure by a composite spring of the base-plate bead 6 and the rubber bead produced when they are compressed and deformed, and this composite structure makes it possible to reduce the hardness of the base plate 2 that forms the base-plate bead 6. The beads contact the upper and lower joint surfaces at the flat surfaces of the compressed and deformed elastic sealing material 8 and 10, and the soft elastic sealing material 8 and 10 come into tight contact with the joint surfaces, eliminating any small spaces in the tool marks, thereby sealing the combustion gas that leaks from the thickness-increased portion 16 under pulsating pressure mentioned above.

In a gasket of a structure that an elastic sealing material is filled only in the concave portion of the base-plate bead 6, when the elastic sealing material 10 is compressed and deformed, an external force is generated to deform the base-plate bead 6 and the flat portion on each side continuous to the base-plate bead 6 in such a manner that they warp upward. The lower the hardness of the base plate 2 is made to inhibit fatigue failure of the base-plate bead 6 and hold down the cost of the base plate 2, the more conspicuous the deformation, such as upward warp is likely to become. In this embodiment, the second elastic sealing material 8 is provided also on the convex portion side to let the second elastic sealing material 8 be deformed to prevent deformation of the base-plate bead 6 and the base plate 2, thereby preventing the deterioration of the seal performance by the first elastic sealing material 10 in the concave portion.

In the filling of the first elastic sealing material 10, the center portion of it is likely to cave in a little in a transition from high temperature to open cooling. In this embodiment, protrusions 11 and 9 are formed, even when the gasket is adopted in an engine whose fastening axial tension is weak, a stable seal performance can be secured at low lost in the region outside the circumference of the combustion chamber opening 3. After the bolts are fastened, the protrusions 11 and 9 are in a crushed and flattened state.

No fastening problem arises in the vicinity of bolts 4 as long as the bolts are fastened properly. However, the oil holes 5 and the chain chamber hole 17 are in an improperly fastened state because they are remote from clamping bolts. Because the engine is subjected to repeated thermal cycles as many times as it is used, the fastening axial tension decreases to some extent. The gasket is deformed by heat during engine operation, thus aggravating the sealing condition.

In order to implement a complete seal under those adverse conditions, in the prior art, in the bead structure having the elastic sealing material filled in the concave portion of the base-plate bead 6, if the hardness of the base plate 2 is increased, the spring force is increased, but the bead may suffer fatigue failure by vibration amplitude, and it is not desirable to increase the hardness so much; on the other hand, if the hardness of the base-plate bead 6 is decreased, deformation mentioned above will occur, resulting in a decrease in the spring force. To make up for this shortcoming, in this embodiment, as described above, in addition to the first elastic sealing material 11 filled in the concave portion of the base-plate bead 6, the second elastic sealing material 8 is formed on the convex portion on the reverse side of the concave portion, and the second elastic sealing material 8, structured such that its width is wider than the width of the base-plate bead 6 and its height is substantially the same height of the base-plate bead 6, serves to prevent deformation of the base plate 2 and the base-plate bead 6.

As the hardness of the base plate 2 is lowered, the spring force is made low, but because the first elastic sealing material 8 is formed, on the convex portion, with a height equal to the height of the base-plate bead 6 to thereby regulate the deformation by the elastic sealing material 10 filled in the concave portion, with the result that the BD bead is provided with a spring force equal to or greater than a spring force by a structure that uses the base plate 2 of a high-hardness material.

Further, when the elastic sealing material 10 is formed by molding, the concave portion side of the base-plate bead 6 is processed so as to be flush with the flat surface of the base plate 2. During molding, the sealing material 10 expands thermally by high temperature, but when it is open-cooled, the central portion of the rubber large in thickness shrinks by an amount corresponding to thermal expansion, and caves in slightly, and in the portions, away from a clamping bolt, which are not fastened properly and overhang, the surface pressure may decrease, leaving chances of pressure leak.

As countermeasures, according to the invention in this patent application, as shown in FIG. 38, a small protrusion 11 is formed in the middle of the surface of the elastic sealing material 10 in the concave portion of the base plate 6, the bead is deformed without increasing the fastening load so much, and when the surface pressure decreases, the protrusion 11 formed on the surface of the first elastic sealing material 10 bulges and deforms accordingly. Though small in terms of area, the protrusion generates a high surface pressure, and serves to apply a complete seal. In other words, located in a position away from the clamping bolt to the outer circumference side, the surface pressure tends to become relatively small, the elastic sealing material on both surfaces of the base-plate bead 6 is normally pressed to the opposed joint surfaces to apply the seal by the compressed and deformation of the bead by the fastening load. At this time, the protrusion 11 formed on the elastic sealing material 10 on the concave portion side is deformed in a manner to be pushed into the concave portion, adapts itself to the flat surface of the joint surface, and becomes substantially flush with the flat surface (underside) of the base plate 2.

When, from the steady state, the clearance between the opposed joint surfaces at the bead position increases by vibration, for example, the surface pressure temporarily decreases, the compression-deformed amount of the bead decreases, thus reducing the sealing pressure. At the elastic sealing material 10 on the concave portion side, according to an increase in the clearance, the protrusion 11 automatically bulges to securely retain contact with the opposite joint surface and has the contact surface decreased, and can maintain the seal condition by an increase in the surface pressure by the protrusion. As the clearance decreases, the steady state is restored.

In the foregoing, description has been made of a case where the surface pressure decreases with changes in the clearance between the opposed joint surfaces. Even when the clearance between the opposed joint surfaces remain unchanged or even when the spring force decreases with deterioration with time and the surface pressure becomes smaller, as described above, because load concentrates on the protrusion 11 as the surface pressure decreases (the protrusions 11 and 9 do not necessarily bulge in this case), the surface pressure rises at the position of the protrusion 11, making it possible to maintain a specified sealing pressure.

Figure 40:
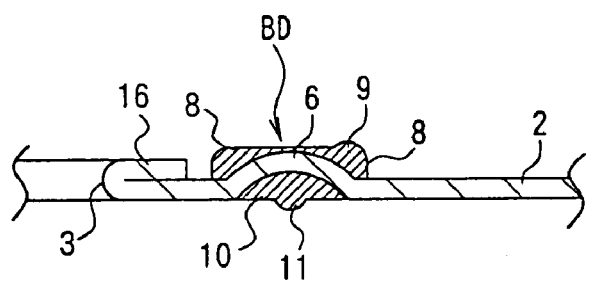
FIG. 40 is another example of a protrusion formed.

When the change in the gap at the bead position between the joint surfaces is large, it is preferable to form a protrusion 9 also on the elastic sealing material on the convex portion of the base-plate bead 6, as shown in FIG. 40.

Figure 41:
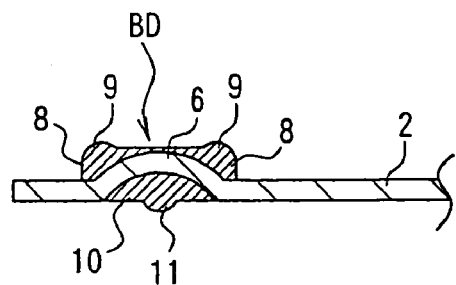
FIG. 41 is yet another example of a protrusion formed.
Figure 42:
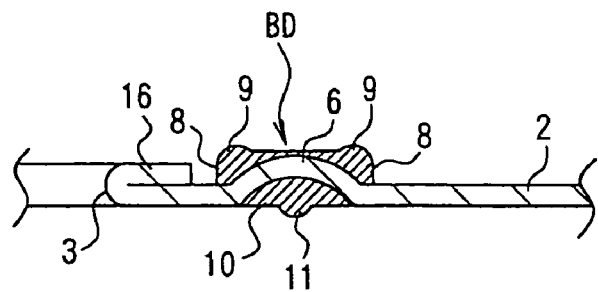
FIG. 42 is a further example of a protrusion formed.

The protrusions 11, 9 arranged in the bead-width direction are not limited to one, and may be two or more as shown in FIGS. 41 to 43. When two or more protrusions are provided, the height of the protrusions 11, 9 may be made different. The magnitude of the protrusions may also be different. When a plurality of protrusions are formed, load of surface pressure can be alleviated, or if the surface pressure decreases, a labyrinth effect may be obtained by the plurality of protrusions 11, 9 or the de facto increase of the seal lines SL provides an effect of a stable sealing property for an extended period of time.

Further, with regard to the plurality of protrusions 11, 9, by making variations in the size or shape (the area unit length in a longitudinal sectional profile or a plan view) of the protrusions 11, 9 to seek optimization of the protrusions 11, 8 as shown in FIGS. 44 to 47, it is possible to enlarge the above-mentioned effects. In other words, when providing two or more protrusions in parallel widthwise, it is preferable to make the height of the protrusions 11, 9 relatively low or reduce the area per unit length on the higher surface pressure side.

With regard to a single-line protrusion 11, 9 extending along the seal line, it is possible to change the height or shape of the protrusion 11, 9 according to the surface pressure at the location of the protrusion 11, 9. In other words, in the areas where the surface pressure is relatively smaller, the height and the width of the protrusion 11, 9 may be increased.

The protrusions 11, 9 may be formed continuously along the whole length of the seal lines SL1 and SL2 or intermittently at specified intervals.

When the protrusions 11, 9 are formed partly on the seal lines SL1, SL2, they should be formed at positions that are far from the bolt hole 4 and at relatively low surface pressure or at parts where changes in the clearance between the opposed joint surfaces are relatively large (the amplitude of surface pressure change is relatively large).

Figure 48:
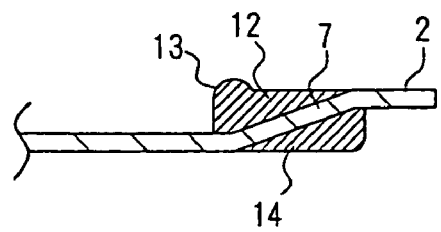
FIG. 48 is an example in which the base-plate bead is a half bead.
Figure 49:
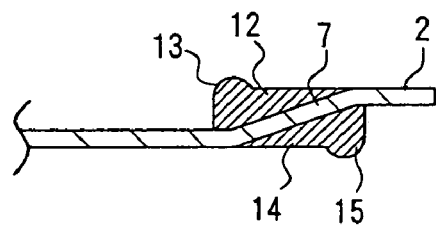
FIG. 49 is an example in which the base-plate bead is a half bead.

In this embodiment, description has been made of the base-plate bead 6 as a full bead, but this embodiment is applicable when the base-plate bead 6 is a half bead in a stepped structure. More specifically, as shown in FIGS. 48 and 49, a second elastic sealing material 12 is fixed to the convex portion (the portion rising from the flat part of the base plate) of the base-plate bead 6 in a stepped form, a first elastic sealing material 14 is applied to the concave portion on the reverse side of the convex portion, and then protrusions 13, 15 are formed at the thick portions. The operation and the effect are the same as in the above-mentioned embodiment.

Figure 50:
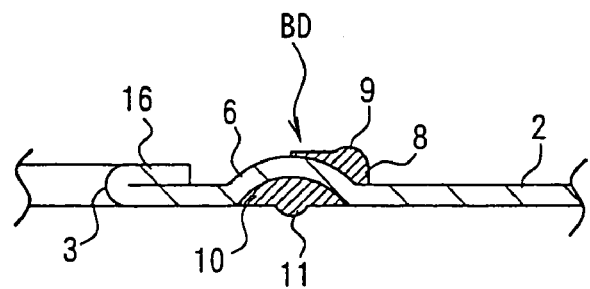
FIG. 50 is a modification of a second elastic sealing material.

In the bead BD in the vicinity of the thickness-increased portion 16, the second elastic sealing material need not necessarily be attached to both sloped sides of the convex portion as shown in FIG. 50. In other words, receiving a relatively high surface pressure and having a strong force to constrain the base plate, the thickness-increased portion 16 inhibits the base plate from being deformed. This applies to the portions in the vicinity of clamping bolts.

The height of the protrusions 11, 9 should be designed such that the deformation ratio is not more than 25% when the protrusions are deformed to reach the thickness of the thickness-increased portion 16, regardless of the shape of protrusions.

In the above example, description has been made of a metallic gasket having a single base plate. In a metallic gasket, a plurality of base plates, each having the above-mentioned structure, may be stacked one over another according to the space between the joint surfaces. In this case, the base plates need not necessarily be stacked such that the convex portions of the base-plate beads are arranged face-to-face with each other as in prior art.

The other aspects of the structure, the operation and the effect are the same as in the above-mentioned embodiments.

INDUSTRIAL APPLICABILITY

As is clear from the above description, in the present invention, since the amount of elastic sealing material on the convex portion side of the metal bead is increased, the compression-deformed amount is increased, with the result that the elastic sealing material can be processed more easily. In addition, because the thickness of the elastic sealing material can be increased, a larger processing tolerance can be set, which makes it possible to reduce manufacturing cost.

Further, the elastic sealing material fixed to the convex portion of the metal bead is less likely to be exposed to cooling water, and the elastic sealing material filled in the concave portion of the metal bead is covered by the bead and is not exposed to cooling water. Therefore, the elastic sealing material parts are prevented from deteriorating, making it possible to maintain the stable seal performance for extended periods of time.

Further, a necessary sealing pressure can be obtained by synergy of the resilience of the metal bead and the elastic resilience of the elastic sealing material fixed to the convex portion and filled in the concave portion. The resulting effects are that the hardness of the base plate material can be reduced, thus eliminating need to worry about fatigue failure of the metal bead of the base plate, and that the roughness of the seal area is absorbed, making it possible to properly seal cooling water, oil pressure, or the like with a lesser surface pressure without increasing the bead width to an inappropriate extent.

Further, wide seal areas can be obtained for the elastic sealing material parts on the convex portion and in the concave portion of the metal bead, and the consequent results are that the flaws on the joint surface and the blowholes that occur in casting can be sealed properly with a low surface pressure, that the elastic sealing material, a rubber-based material above all else, has a smaller gasket factor, making it possible to a limited axial tension load in the areas under unfavorable conditions and thus decrease total load.

What is claimed is:

1. A metallic gasket comprising a base plate made of a thin metal plate having formed therein a plurality of combustion chamber openings arranged adjacent to each other, and a thickness-increased portion thicker than the remaining portions of said base plate, and seal lines formed encircling said internal circumference of each combustion chamber opening, and beads formed along said seal lines, wherein in a boundary area between said adjacent combustion chamber openings, common beads are formed and shared by beads around said adjacent combustion chamber openings, wherein beads formed along neighboring peripheral edges of said adjacent combustion chamber openings are combined to form a bead in an integral structure, wherein the width of said thickness-increased portions located in said boundary area and extending along said internal circumferences of said combustion chamber openings are set in proportion to a clearance between said adjacent combustion chamber openings, wherein said bead is a composite body of a metal bead formed as a convex portion having a height higher than said thickness-increased portion by bending said base plate in the through-thickness direction, and a rubber bead formed with each metal bead, pairing off a surface side with a reverse side by fixing to said convex portion of said metal bead an elastic sealing material capable of exhibiting a spring force by compressing and deforming in the through-thickness direction and by filling said concave portion on the reverse side of said convex portion with said elastic sealing material with an amount being substantially equal to the capacity of the concave portion, and wherein said elastic sealing material is fixed at least to the inclination surface of said convex portion of the metal bead, a top surface of the rubber bead fixed to the surface side of the convex portion is formed substantially in parallel with the flat surface of the base plate and an edge surface of the rubber bead formed at a distance from the top of the convex portion and is located between the convex portion and the thickness-increased portion, and the height of said elastic sealing material is set to be equal to or substantially equal to the height of said metal bead.

2. A metallic gasket according to claim 1, wherein said thickness-increased portion is varied in thickness partly to equalize the surface pressure when said gasket is inserted between said joint surfaces.

3. A metallic gasket including a base plate made of a thin metal plate, said base plate having a plurality of seal lines, a bead formed along each of said seal lines, and a converge-diverge part formed where at least some of said plurality of seal lines converge or diverge at specified points, wherein said bead formed along each of said seal lines comprises, in combination, a metal bead and a rubber bead formed with each metal bead, pairing off a surface side of the metal bead with a reverse side of the metal bead, said metal bead being formed in a convex form only on one surface of said base plate by bending in a through-thickness direction thereof and a rubber bead made of an elastic sealing material being fixed to a surface of said convex portion of said metal bead and filled in a concave portion on the reverse side of said convex portion with an amount being substantially equal to the capacity of the concave portion, said rubber bead being compressed and deformed in said through-thickness direction in cooperation with the deformation of said metal bead, and wherein at least in said converge-diverge part, said elastic sealing material on an inclination surface of said convex portion is fixed to a surface of said metal bead in such a manner that its width is substantially equal to the width of said metal bead and said elastic sealing material covers both sides across the width of the width of said metal bead and a top surface of the rubber bead fixed to the surface side of the convex portion is formed substantially in parallel with the flat surface of the base plate and an edge surface of the rubber bead formed at a distance from the top of the convex portion, and the height of said rubber bead is set to be equal to or substantially equal to the height of said metal bead.

4. A metallic gasket according to claim 3, wherein a thickness-increased portion is formed on said base plate by partly increasing the thickness of the base plate in the through-thickness direction, and the compression-deformed amount of said bead is regulated by an increased thickness of said thickness-increased portion.

5. A metallic gasket according to claim 3, wherein by adjusting the width of said rubber bead in said converge-diverge part, said sealing pressure in said converge-diverge part is made to match or come close to said sealing pressure at said seal lines other than said converge-diverge part.

6. A metallic gasket according to one of claim 3, wherein in said converge-diverge part where said metal bead diverges from a full bead into a plurality of full beads or a plurality of full beads converge into a full bead, said rubber bead width is adjusted so that the ratio of said rubber bead width on said convex portion side of said metal bead to said metal bead width becomes smaller in said converge-diverge part than in the remaining portions of said bead.

7. A metallic gasket including a base plate having a planar surface made of a thin metal plate, said base plate having at least two openings, such as bolt holes, and having beads formed along seal lines and a first thickness-increased portion made thicker than the remaining portions of said base plate, a surface pressure being made to concentrate on said first thickness-increased portion and said beads being deformed in a through-thickness direction to thereby seal a joint of opposing joint surfaces when said metallic gasket is sandwiched between the joint surfaces and fastened by clamping bolts, wherein said bead comprises, in combination, a metal bead formed along a seal line and a rubber bead formed with each metal bead, pairing off a surface side of the metal bead with a reverse side of the metal bead, said metal bead being formed by bending said base plate in a through-thickness direction to create a convex portion, on one surface side of said base plate, with a height higher than the thickness-increased portion, and said rubber bead made of an elastic sealing material covering and fixed to at least opposing sides of an inclination surface of said convex portion of said metal bead and extending onto a portion of the planar surfaces, and filled in a concave portion opposite said convex portion with an amount being substantially equal to the capacity of the concave portion, and wherein the height of said elastic sealing material fixed to the inclination surface of said convex portion of said metal bead is equal to or substantially equal to said convex portion of said metal bead and its top surface of the rubber bead fixed to the surface side of the convex portion is substantially parallel with the flat planar surface of said base plate and an edge surface of the rubber bead extending from the top of the convex portion and is located between the convex portion and the thickness-increased portion, and said rubber bead is compressed and deformed in the through-thickness direction in cooperation with deformation of said metal bead.

* * * * *